(12) United States Patent
Yamamoto

(10) Patent No.: US 11,624,308 B2
(45) Date of Patent: Apr. 11, 2023

(54) CONTROL APPARATUS

(71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/711,533

(22) Filed: Apr. 1, 2022

(65) Prior Publication Data

US 2022/0220881 A1 Jul. 14, 2022

Related U.S. Application Data

(63) Continuation of application No. PCT/JP2020/034279, filed on Sep. 10, 2020.

(30) Foreign Application Priority Data

Oct. 2, 2019 (JP) .............................. JP2019-182360

(51) Int. Cl.
*F01N 9/00* (2006.01)
*F01N 11/00* (2006.01)

(52) U.S. Cl.
CPC ................ *F01N 9/00* (2013.01); *F01N 11/00* (2013.01); *F01N 2240/16* (2013.01); *F01N 2390/02* (2013.01); *F01N 2560/05* (2013.01); *F01N 2560/20* (2013.01); *F01N 2900/0416* (2013.01);
(Continued)

(58) Field of Classification Search
CPC ........ F01N 9/00; F01N 11/00; F01N 2240/16; F01N 2390/02; F01N 2560/05; F01N 2560/20; F01N 2900/0416; F01N 2900/1404; F01N 2900/0602; F01N 2900/14; F01N 2900/16; F01N 2900/1631; G01N 27/04
See application file for complete search history.

(56) References Cited

U.S. PATENT DOCUMENTS 8,561,388 B2 * 10/2013 Yahata ............... G01N 15/0656
60/297
2012/0144813 A1 6/2012 Yahata et al.
2015/0153249 A1 6/2015 Goulette et al.
(Continued)

FOREIGN PATENT DOCUMENTS

| JP | 2016-37899 | 3/2016 |
| JP | 2016-170118 | 9/2016 |
| JP | 2018-17633 | 2/2018 |

*Primary Examiner* — Brandon D Lee
(74) *Attorney, Agent, or Firm* — Nixon & Vanderhye P.C.

(57) ABSTRACT

In a control apparatus, a heater adjuster performs a regeneration task of causing a heater to heat a sensing member of a particulate matter sensor to burn particulate matter deposited on the sensing member to thereby remove the particulate matter from the sensing member. The heater adjuster performs a deposition reduction task of maintaining, for a predetermined duration, a temperature of the sensing member at a deposition reduction temperature that reduces additional particulate-matter deposition on the sensing member. The predetermined duration is defined from completion of a regeneration task to a time when an environmental condition around the particulate matter sensor is determined to be stable. The heater adjuster stops the heater from heating the sensing member if a condition determiner determines that the environmental condition around the particulate matter sensor is stable.

11 Claims, 10 Drawing Sheets

(52) U.S. Cl.
CPC ............. *F01N 2900/1402* (2013.01); *F01N 2900/1404* (2013.01)

(56) References Cited

U.S. PATENT DOCUMENTS

| | | |
|---|---|---|
| 2015/0211405 A1 | 7/2015 | Yoshidome et al. |
| 2018/0313243 A1 | 11/2018 | Tamura et al. |
| 2020/0080953 A1 | 3/2020 | Yamakoshi et al. |

\* cited by examiner

CONTROL APPARATUS

CROSS-REFERENCE TO RELATED APPLICATION

The present application is a continuation application of International Application No. PCT/JP2020/034279 filed Sep. 10, 2020, which claims priority to Japanese Patent Application No. 2019-182360 filed on Oct. 2, 2019. The contents of these applications are incorporated herein by reference in their entirety.

TECHNICAL FIELD

The present disclosure relates to apparatuses for controlling a particulate matter sensor.

BACKGROUND

Recent vehicles require reduction in particulate matter exhausted therefrom to the outside together with an exhaust gas. For satisfying such a requirement, a particulate filter and a particulate matter sensor are provided in an exhaust pipe.

SUMMARY

In a control apparatus according to an exemplary aspect of the present disclosure, a heater adjuster performs a regeneration task of causing a heater to heat a sensing member of a particulate matter sensor to burn particulate matter deposited on the sensing member to thereby remove the particulate matter from the sensing member. The heater adjuster performs a deposition reduction task of maintaining, for a predetermined duration, a temperature of the sensing member at a deposition reduction temperature that reduces additional particulate-matter deposition on the sensing member. The predetermined duration is defined from completion of a regeneration task to a time when an environmental condition around the particulate matter sensor is determined to be stable. The heater adjuster stops the heater from heating the sensing member if a condition determiner determines that the environmental condition around the particulate matter sensor is stable.

DESCRIPTION OF EMBODIMENTS

Figure 1:
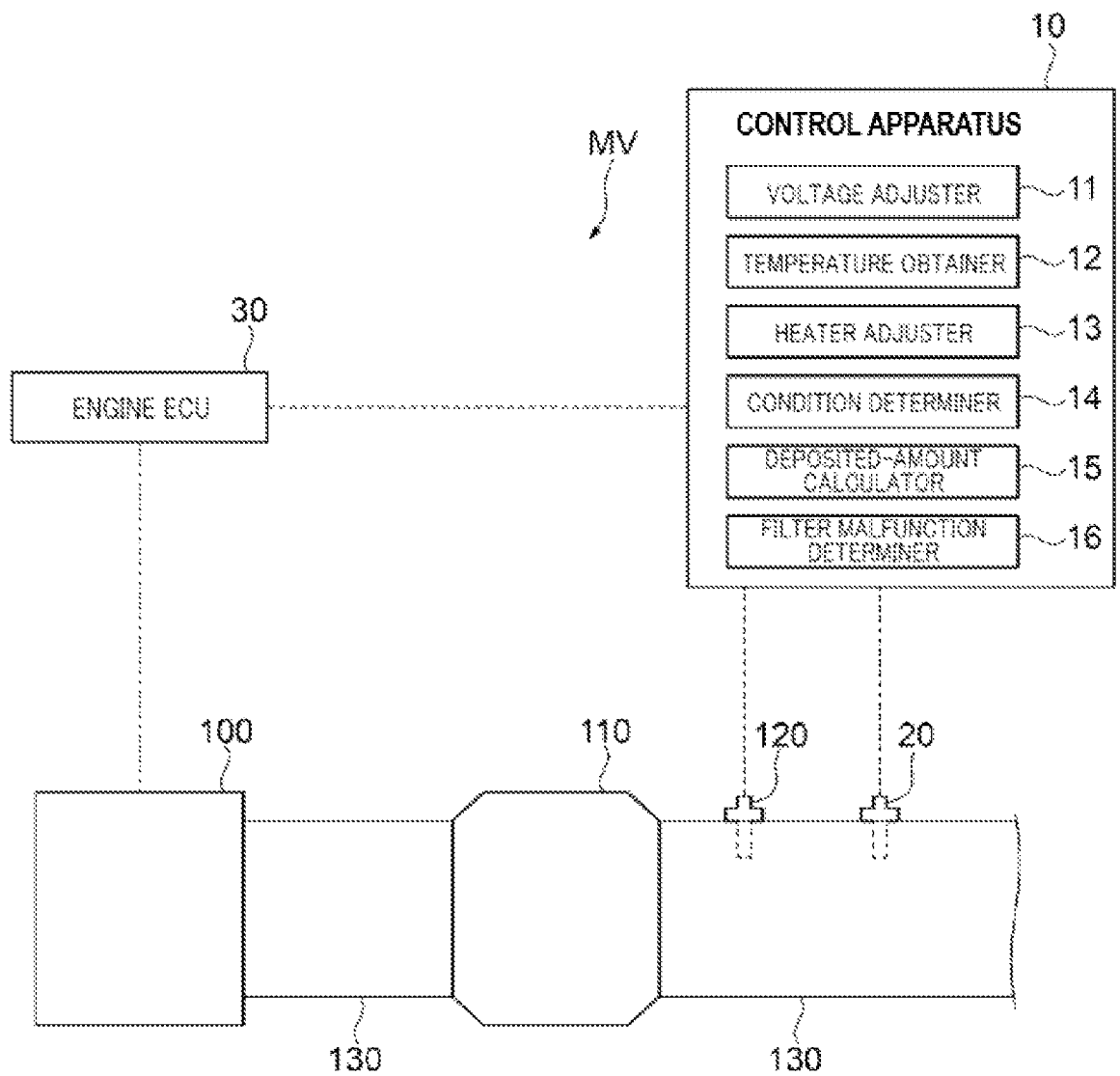
FIG. 1 is a diagram schematically illustrating a control apparatus according to an exemplary embodiment and a vehicle in which the control apparatus is installed.

Such a particulate filter aims to trap particulate matter contained in an exhaust gas, and the particulate matter sensor, which is disposed downstream of the particulate filter, aims to measure particulate matter leaking from the particulate filter.

This arrangement of the particulate filter and the particulate matter sensor enables whether the particulate filter is operating normally to be determined in accordance with an output of the particulate matter sensor.

Such a particulate matter sensor disclosed in Japanese Patent Application Publication No. 2012-122399 includes a sensing member having a pair of electrodes formed thereon with a predetermined interval therebetween. Applying a voltage between the pair of electrodes enables a current, whose level depends on the amount of particulate matter deposited on the sensing member, to flow through the pair of electrodes The published patent document also discloses a failure detecting apparatus. The failure detecting apparatus disclosed in the published patent document performs a regeneration task of heating the sensing member using a heater to remove particulate matter originally deposited on the sensing member, thus regenerating the sensing member. After the regeneration task, the failure detecting apparatus disclosed in the published patent document performs a calculation task of calculating, while applying a voltage between the pair of electrodes, the amount of particulate matter estimated to be deposited on the sensing member; the amount of the particulate matter estimated to be deposited on the sensing member increases over time if there is a failure in the sensing member.

Specifically, the calculation task calculates, based on a present value of each of the flow rate and temperature of the exhaust gas, the amount of particulate matter estimated to be deposited on the sensing member if there is a failure in the sensing member.

Then, the failure detecting apparatus determines whether a current flows between the pair of electrodes at the timing when the calculated amount of particulate matter estimated to be deposited on the sensing member has just reached a predetermined amount that enables the current to flow therebetween. In response to determination that no current flows between the pair of electrodes, the failure detecting apparatus determines that the particulate filter is operating normally. Otherwise, in response determination that a current flows between the pair of electrodes, the failure detecting apparatus determines that there is a failure in the particulate filter.

Proper determination of whether the particulate filter has failed needs accurate calculation of the amount of particulate matter estimated to be deposited on the sensing member. It may be however difficult to accurately calculate the amount of particulate matter estimated to be deposited on the sensor element under unstable environmental conditions around the particulate matter sensor, such as engine-output fluctuations. This is because the amount of particulate matter existing around the particulate matter sensor is unstable under the unstable environmental conditions.

From this viewpoint, we consider a measure that waits until the environmental conditions around the particulate matter sensor become stable, and thereafter sequentially performs the regeneration task of regenerating the sensing member and the calculation task of calculating the amount of particulate matter estimated to be deposited on the sensing member.

Unfortunately, for the considered measure, there may still remain a case where the environmental conditions around the particulate matter sensor become unstable again during the regeneration task, making it difficult to perform accurate calculation of the amount of particulate matter estimated to be deposited on the sensing member.

As described above, there has been scope for improvement in accurate calculation of the amount of particulate matter estimated to be deposited on the sensing member.

The present disclosure aims to provide control apparatuses, each of which is capable of accurately calculating the amount of particulate matter estimated to be deposited on a sensing member of a particulate matter sensor.

One aspect of the present disclosure is a control apparatus for a particulate matter sensor as a control target. The particulate matter sensor includes a sensing member including a pair of electrodes arranged to face one another, and a heater for heating the sensing member. The particulate matter sensor is configured to cause a current having a level depending on an amount of particulate matter deposited on the sensing member to flow between the pair of electrodes. The control apparatus includes a voltage adjuster configured to apply a voltage between the pair of electrodes, and adjust the voltage applied therebetween, and a heater adjuster configured to cause the heater to generate heat, and adjust an amount of the heat generated by the heater. The apparatus includes a condition determiner configured to determine whether an environmental condition around the particulate matter sensor is stable.

The heater adjuster is configured to perform
1. A regeneration task of causing the heater to heat the sensing member to burn the particulate matter deposited on the sensing member to thereby remove the particulate matter from the sensing member
2. A deposition reduction task of maintaining, for a predetermined duration, a temperature of the sensing member at a deposition reduction temperature that reduces additional particulate-matter deposition on the sensing member The predetermined duration is defined from completion of the regeneration task to a time when the environmental condition around the particulate matter sensor is determined to be stable.

The heater adjuster is configured to stop the heater from heating the sensing member if the condition determiner determines that the environmental condition around the particulate matter sensor is stable. The voltage adjuster is configured to start application of the voltage between the pair of electrodes.

The control apparatus according to the one aspect of the present disclosure performs the deposition reduction task for the predetermined duration that is defined from completion of the regeneration task to the time when the environmental condition around the particulate matter sensor is determined to be stable. This prevents a new additional deposition of particulate matter to the sensing member during the predetermined duration. This enables the sensing member to be maintained in a refreshed state at a timing when the regeneration task for the sensing member is completed, i.e., in the refreshed state where a particulate-matter quantity adhering to the sensing member is substantially zero.

Thereafter, when the environmental condition around the particulate matter sensor is determined to be stable, the voltage adjuster starts application of the voltage between the pair of electrodes.

The configuration of the control apparatus eliminates the need of performing the regeneration task after the environmental condition around the particulate matter sensor becomes stable. This results in an increase in the possibility of, while the environmental condition around the particulate matter sensor is maintained to be stable, accurately calculating estimates of particulate matter deposited on the sensing member and completing, based on one of the calculated estimates, reliable malfunction determination of a particulate filter.

The one aspect of the present disclosure therefore provides the control apparatus, which is capable of accurately calculating the amount of particulate matter estimated to be deposited on the sensing member of the particulate matter sensor.

The following describes an exemplary embodiment of the present disclosure with reference to the accompanying drawings. For simple understanding of the following descriptions, descriptions of identical or like components illustrated in the drawings, to which identical or like reference characters are assigned, are omitted or simplified to avoid redundant descriptions.

A control apparatus 10 according to the exemplary embodiment is installed, together with a particulate matter sensor 20, in a vehicle MV. The control apparatus 10 is configured to control the particulate matter sensor 20.

The following describes the configuration of the vehicle MV according to the primary embodiment with reference to FIG. 1.

FIG. 1 schematically illustrates only an internal combustion engine, which will be referred to simply as an engine, 100 and an exhaust system for the engine 100 in the vehicle MV. The vehicle MV includes the engine 100, an exhaust pipe 130, a particulate filter 110, and an exhaust temperature sensor 120.

The engine 100 is configured to burn fuel to thereby generate drive power for causing the vehicle MV to travel. The exhaust pipe 130 discharges, to the outside of the vehicle MV, an exhaust gas generated by the burning of the fuel in the engine 100.

The particulate filter 110 is coupled between a first portion of the exhaust pipe 130 and a second portion of the exhaust pipe 130, and configured to trap particles contained in the exhaust gas. The particulate filter 110 can also be referred to as a diesel particulate filter (DPF) or a gasoline particulate filter (GPF). The particulate filter 110 is comprised of a porous ceramic body that has a plurality of channels that have a grid pattern. Each channel of the porous ceramic body has opposite inlet and outlet ends, the inlet ends of selected channels in the plurality of channels are plugged, and the outlet ends of the remaining channels in the plurality of channels are plugged. The selected channels, each of which has the plugged inlet end, and the remaining channels, each of which has the plugged outlet end, are alternately arranged to constitute the porous ceramic body.

Because the above configuration of the particulate filter 110 is one of known configurations for such a particulate filter, the description and illustration of the configuration of the particulate filter 110 are omitted.

The exhaust temperature sensor 120 is adapted to measure the temperature of the exhaust gas passing through the exhaust pipe 130. The exhaust temperature sensor 120 is disposed downstream of the particulate filter 110 in the exhaust pipe 130, for example, disposed adjacent to the particulate matter sensor 20, which will be described later, in the exhaust pipe 130.

The exhaust temperature sensor 120 is configured to transmit, to the control apparatus 10 described later, the measured temperature of the exhaust gas.

The particulate matter sensor 20 is adapted to measure the amount of particulate matter contained in the exhaust gas that has passed through the particulate filter 110. The particulate matter sensor 20 is disposed downstream of the particulate filter 110 in the exhaust pipe 130. The particulate matter sensor 20, which is located downstream of the particulate filter 110 in the exhaust pipe 130, makes it possible to measure particles, which constitute the particulate matter, contained in the exhaust gas emitted externally from the vehicle MV. The particulate matter sensor 20 is also adapted to immediately diagnose that malfunction has occurred in the particulate filter 110. The particulate matter sensor 20 is configured to transmit, to the control apparatus 10, a measurement signal indicative of the amount of particulate matter contained in the exhaust gas.

Figure 2:
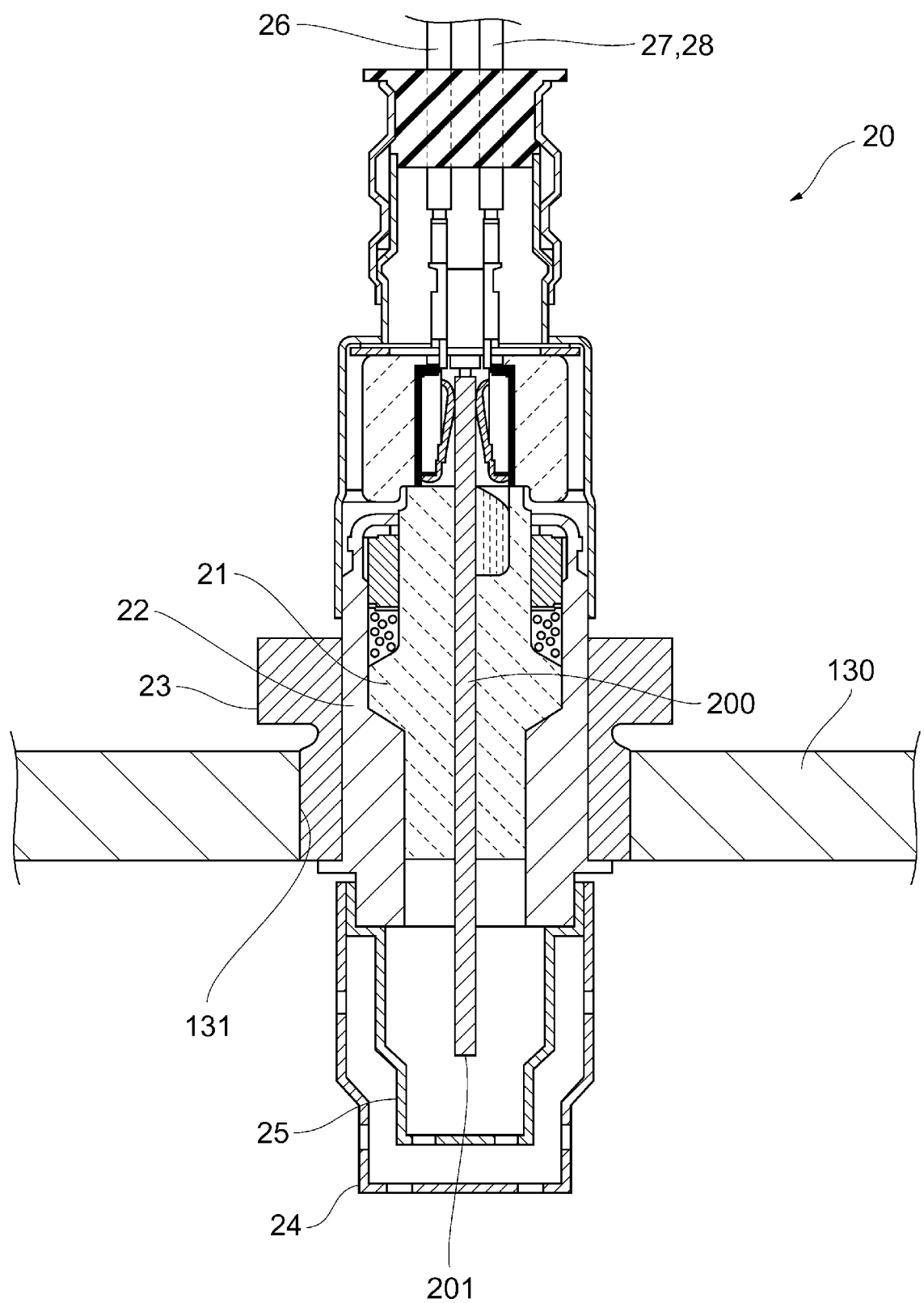
FIG. 2 is a cross-sectional view of a particulate matter sensor illustrated in FIG. 1.

The following describes the configuration of the particulate matter sensor 20 with reference to FIG. 2.

In FIG. 2, reference character 130 represents a cross section of a wall of the exhaust pipe 130. In FIG. 2, an upper part over the pipe wall represents an outside space of the exhaust pipe 130, and a lower part under the pipe wall represents an inside space of the exhaust pipe 130. The wall of the exhaust pipe 130 has a through hole 131 formed therethrough, and the particulate matter sensor 20 is fitted in the through hole 131 with a first part of the sensor 20 projecting into the inside space of the pipe 130.

Figure 3:
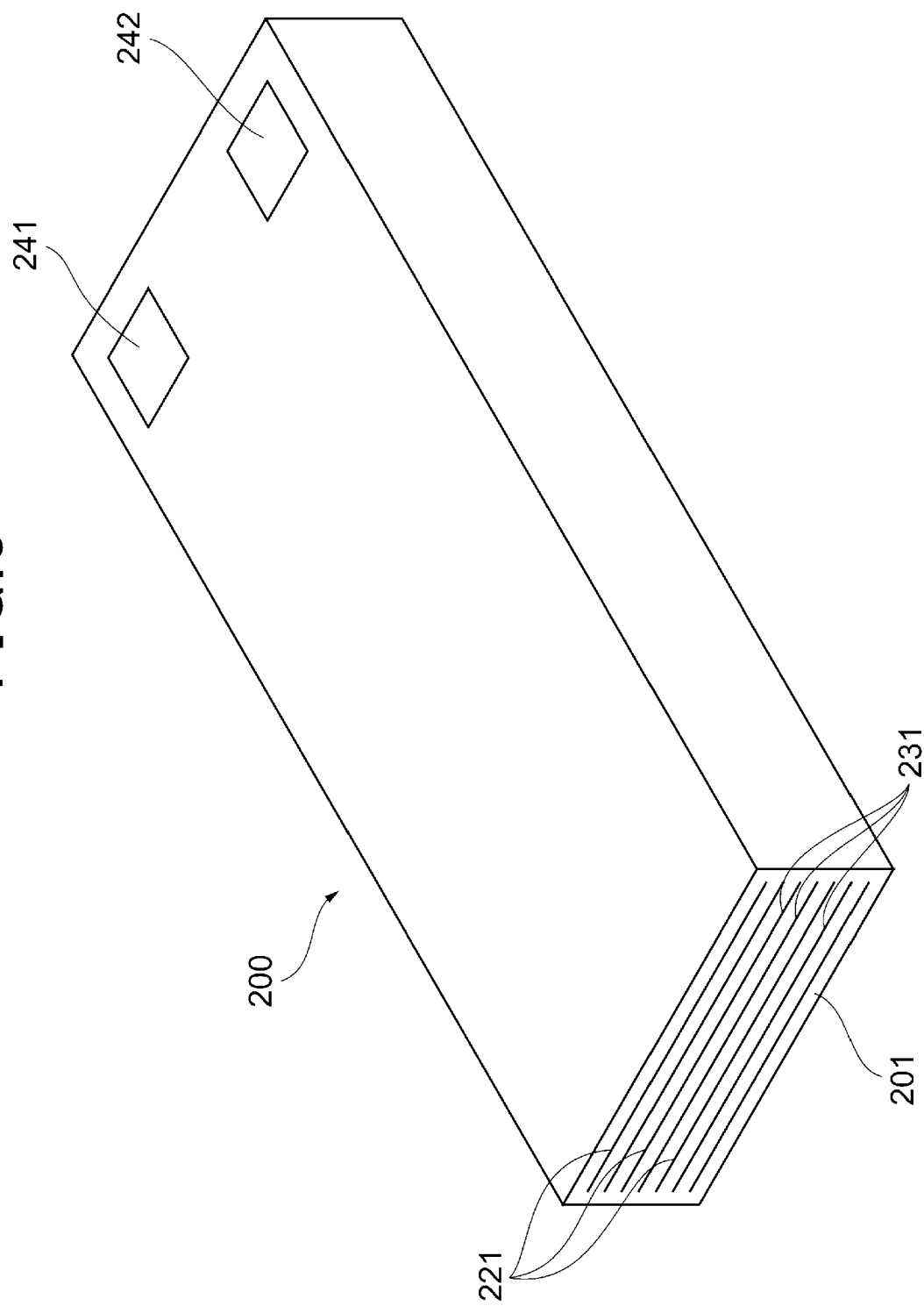
FIG. 3 is a perspective view illustrating an outer appearance of a sensing member included in the particulate matter sensor.

The particulate matter sensor 20 includes a sensing member 200 disposed inside thereof. The sensing member 200 is configured as a portion for measuring particulate matter. FIG. 3 schematically illustrates an outer appearance of the sensing member 200, and FIG. 4 is an exploded view of the sensing member 200, which illustrates a specific configuration of the sensing member 200.

Figure 4:
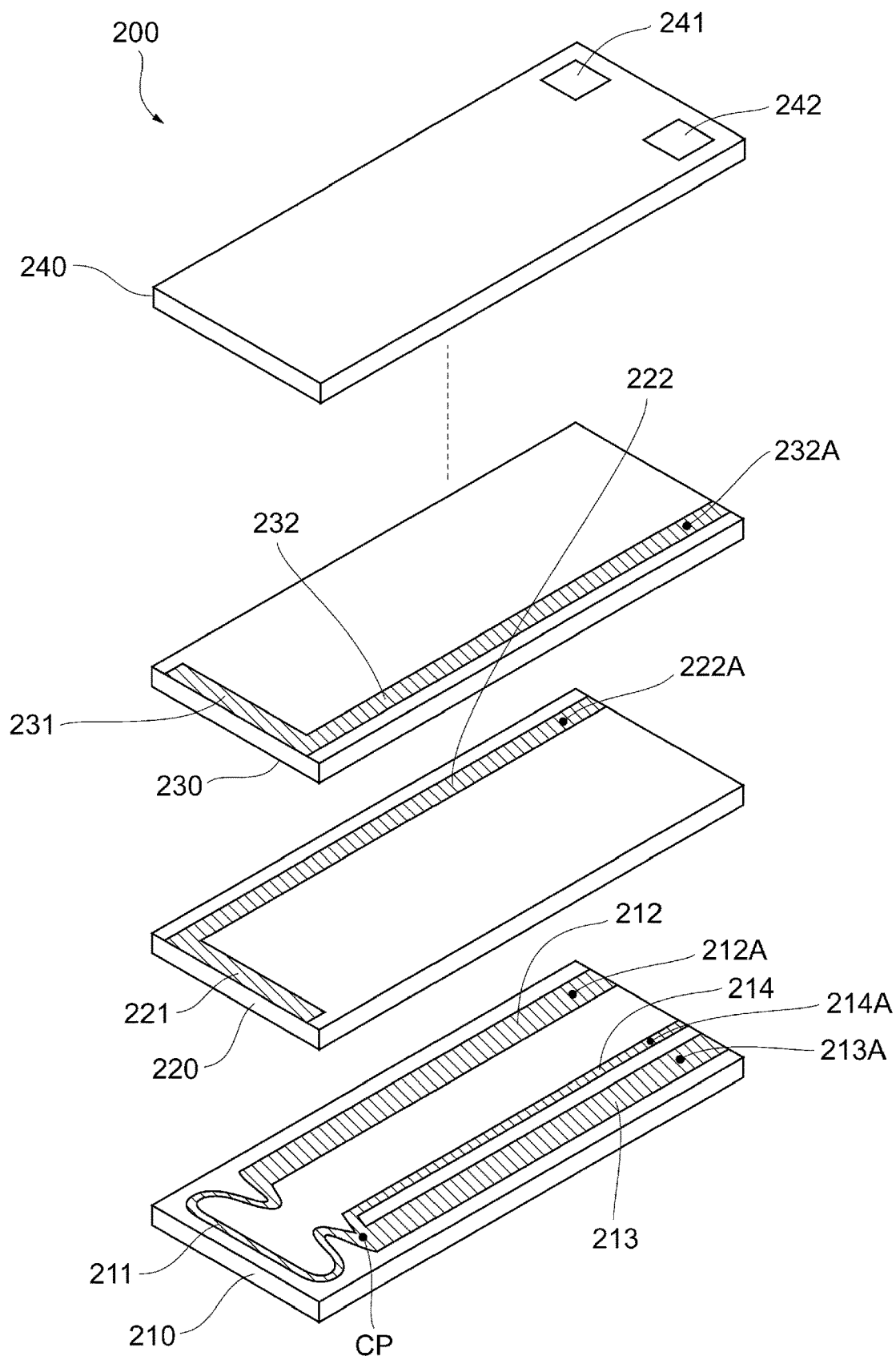
FIG. 4 is an exploded view of the sensing member included in the particulate matter sensor.

The sensing member 200 is, as illustrated in FIG. 4, comprised of the stack of a plurality of rectangular plate-like substrates. Each substrate is a ceramic substrate. One of the substrates, which constitutes the lowermost substrate in the stack, to which reference character 210 is assigned in FIG. 4, has an upper surface on which a heater 211, a pair of lead electrodes 212 and 213, a sense electrode 214 are printed. These heater 211, the pair of lead electrodes 212 and 213, and sense electrode 214 constitute one electrode pattern, and are formed using, for example, screen printing.

The substrate 210 has opposing first and second ends in its longitudinal direction.

The heater 211 is an electrical heater configured to generate heat when energized. The heater 211 is formed on the upper surface of the first end of the substrate 210. The heater 211 is provided to heat, in particular, a measurement surface 201 of the sensing member 200 described later.

The pair of lead electrodes 212 and 213 is formed on the upper surface of the substrate 210 for supplying electrical power to the heater 211. Each of the lead electrodes 212 and 213 is connected to the heater 211 at a correction portion CP thereof, and arranged to extend from the heater 211 toward the second end of the upper surface of the lowest substrate 210. The lead electrodes 212 and 213 have substantially the same length and the same width.

A pair of power wirings 27, which are illustrated in FIG. 2, are connected between the control apparatus 10 and the respective lead electrodes 212 and 213 for enabling electrical power to be supplied from the control apparatus 10 to the heater 211. That is, one of the pair of power wirings 27 is connected to the lead electrode 212, and the other of the pair of power wirings 27 is connected to the lead electrode 213.

The lead electrode 212 of the substrate 210 has a predetermined position 212A, and the substrate 210 has an unillustrated through hole formed through the predetermined position 212A thereof (see FIG. 4). A first end of one of the pair of power wirings 27 is disposed to extend, via the through hole located at the predetermined position 212A, from the underside of the lower surface of the substrate 210 upward in FIG. 4 to be joined to the lead electrode 212. The second end of one of the pair of power wiring 27 is connected to the control apparatus 10.

Similarly, the lead electrode 213 of the substrate 210 has a predetermined position 213A, and the substrate 210 has an unillustrated through hole formed through the predetermined position 213A thereof (see FIG. 4). A first end of the other of the pair of power wirings 27 is disposed to extend, via the through hole located at the predetermined position 213A, from underside of the lower surface of the substrate 210 upward in FIG. 4 to be joined to the lead electrode 213. The second end of the other of the pair of power wiring 27 is connected to the control apparatus 10.

The sense electrode 214 has opposing first and second ends. The first end of the sense electrode 214 is connected to the connection portion CP of the lead electrode 213 to the heater 211. The sense electrode 214 is arranged to extend from the connection portion CP of the lead electrode 213 toward the second end of the upper surface of the lowest substrate 210 in the longitudinal direction of the lowest substrate 210. The sense electrode 214 serves as an electrode for measuring a potential at the connection portion CP of the lead electrode 213 to the heater 211.

The particulate matter sensor 20 also includes a sense wiring 28, which has opposing first and second ends (see FIG. 2). The first end of the sense wiring 28 is connected to the control apparatus 10, and the second end of the sense wiring 28 is connected to the second end of the sense electrode 214. The sense wiring 28, which connects between the sense electrode 214 and the control apparatus 10, enables the control apparatus 10 to obtain the potential at the connection portion CP.

The second end of the sense electrode 214 of the substrate 210 has a predetermined position 214A, and the substrate 210 has an unillustrated through hole formed through the predetermined position 214A thereof (see FIG. 4). The second end of the sense wiring 28 is disposed to extend, via the through hole located at the predetermined position 214A, from the underside of the lower surface of the substrate 210 upward in FIG. 4 to be joined to the second end of the sense electrode 214.

One of the stacked substrates, to which reference character 220 is assigned, is disposed to directly face the upper surface of the substrate 210. The substrate 220 has opposing upper and lower surfaces; the lower surface of the substrate 220 directly faces the upper surface of the substrate 210. Electrodes 221 and 222 are formed on the upper surface of the substrate 220 in FIG. 4; the electrodes 221 and 222 constitute one electrode pattern, and are formed using, for example, screen printing like the heater 211.

The substrate 220 has opposing first and second ends in its longitudinal direction. The electrode 221 is formed on the edge of the first end of the substrate 220 to extend along the edge; the first end of the substrate 220 faces the first end of the substrate 210 on which the heater 211 is formed.

The electrode 221 has opposing first and second ends in the lateral direction of the substrate 220; the first end of the electrode 221 is farther apart than the second end thereof in FIG. 4, in other words, the second end of the electrode 221 is closer than the first end thereof in FIG. 4. The electrode 222 is formed on the upper surface of the substrate 220 to extend from the first end of the electrode 221 toward the second end of the substrate 220 along the longitudinal direction of the substrate 220.

One of the stacked substrates, to which reference character 230 is assigned, is disposed to directly face the upper surface of the substrate 220. The substrate 230 has opposing upper and lower surfaces; the lower surface of the substrate 230 directly faces the upper surface of the substrate 220. Electrodes 231 and 232 are formed on the upper surface of the substrate 230 in FIG. 4; the electrodes 231 and 232 constitute one electrode pattern, and are formed using, for example, screen printing like the heater 211.

The substrate 230 has opposing first and second ends in its longitudinal direction. The electrode 231 is formed on the edge of the first end of the substrate 230 to extend along the edge; the first end of the substrate 230 faces the first end of the substrate 210 on which the heater 211 is formed.

The electrode 231 has opposing first and second ends in the lateral direction of the substrate 230; the first end of the electrode 231 is farther apart than the second end thereof in FIG. 4, in other words, the second end of the electrode 231 is closer than the first end thereof in FIG. 4. The electrode 232 is formed on the upper surface of the substrate 230 to extend from the second end of the electrode 231 toward the second end of the substrate 230 along the longitudinal direction of the substrate 230.

Additionally, one of the stack of the substrates constitutes the uppermost substrate in the stack, to which reference character 210 is assigned in FIG. 4. The uppermost substrate 240 has opposing first and second ends in the longitudinal direction thereof.

As illustrated in FIG. 4, the stack of the substrates includes (1) The substrate 210 constituting the lowermost substrate of the stack
(2) The substrate 240 constituting the uppermost substrate of the stack
(3) The substrates 220 and 230 alternately arranged between the lowermost substrate 210 and the uppermost substrate 240

The sensing member 200, i.e., the stack of the substrates 210, 220, 230, and 240, has opposing first and second end surfaces in the longitudinal direction thereof corresponding to the respective first and second ends of each substrate 210, 220, 230, and 240. The configuration of the stack of the substrates 210, 220, 230, and 240 enables the electrodes 221 and 231 to be exposed on the first end surface of the sensing member 200; the first end surface of the sensing member 200 will be referred to as the measurement surface 201. The exposed electrodes 221 and 231 are alternately arranged in the stack direction of the stack of the substrates 210, 220, 230, and 240.

The uppermost substrate 240 has opposing upper and lower surfaces in FIG. 4; the lower surface of the uppermost substrate 240 is arranged to face one of the substrates 230 or one of the substrates 220 arranged adjacent thereto in FIG. 4. The upper surface of the uppermost substrate 240 in FIG. 4 has a pair of electrodes 241 and 242 formed thereon. The pair of electrodes 241 and 242 are located at the second end of the uppermost substrate 240, which is opposite to the first end of the substrate 210 on which the heater 211 is formed.

The electrode 222 of each substrate 220 has a predetermined position 222A, and the electrode 241 is located to face the predetermined position 222A of each substrate 220 in the vertical direction of FIG. 4. Similarly, the electrode 232 of each substrate 230 has a predetermined position 232A, and the electrode 242 is located to face the predetermined position 232A of each substrate 230 in the vertical direction of FIG. 4.

Each substrate 220 has a first through hole formed through the predetermined position 222A thereof (see FIG. 4), and each substrate 230 has a first through hole formed through a predetermined position thereof aligned with the first through hole, i.e., the predetermined position 222A, of each substrate 220 in the vertical direction of FIG. 4. The substrate 240 has a first through hole formed through a predetermined position thereof aligned with the first through hole of each substrate 220 located at the predetermined position 222A and the first through hole of each substrate 230 in the vertical direction of FIG. 4. The electrode 241 is electrically connected to the electrodes 222 and 221 of the respective substrates 220 through the vertically aligned first through holes.

Similarly, each substrate 230 has a second through hole formed through the predetermined position 232A thereof (see FIG. 4), and each substrate 220 has a second through hole formed through a predetermined position thereof aligned with the second through hole, i.e., the predetermined position 232A, of each substrate 230 in the vertical direction of FIG. 4. The substrate 240 has a second through hole formed through a predetermined position thereof aligned with the second through hole of each substrate 230 located at the predetermined position 232A and the second through hole of each substrate 220 in the vertical direction of FIG. 4. The electrode 242 is electrically connected to the electrodes 232 and 231 of the respective substrates 230 through the vertically aligned second through holes.

A pair of measurement wirings 26, which are illustrated in FIG. 2, are connected between the control apparatus 10 and the pair of electrodes 241 and 242. That is, one of the pair of measurement wirings 26 is connected to the electrode 241, and the other of the pair of measurement wirings 26 is connected to the electrode 242.

As described above, the plurality of electrodes 221 and the plurality of electrodes 231 are disposed on the measurement surface 201 of the sensing member 200 according to the exemplary embodiment. Because the electrodes 221 are connected to each other through the through holes as described above, the electrodes 221 can be regarded, as a whole, as a single electrode. The same can be applied to the plurality of electrodes 231. This therefore enables the collection of electrodes 221 and the collection of electrodes 231 to be regarded as a pair of electrode modules 221 and 231 arranged to face one another.

The control apparatus 10 is configured to apply, through the pair of measurement wirings 26, a predetermined measurement voltage between the electrodes 241 and 242. This results in the predetermined voltage being applied between the pair of electrode modules 221 and 231 partly exposed on the measurement surface 201.

No particulate matter is deposited on the measurement surface 201 results in no current flowing between the pair of electrode modules 221 and 231.

In contrast, a predetermined amount of particulate matter with electric conductivity, which has been deposited on the measurement surface 201, enables a measurable current, i.e., a deposited-amount current, to flow between the pair of electrode modules 221 and 231. The larger the amount of particulate matter, the larger the level of the deposited-amount current flowing between the pair of electrode modules 221 and 231.

As described above, the particulate matter sensor 20 according to the exemplary embodiment includes the sensing member 200 that has the pair of electrode modules 221 and 231 that face each other on the measurement surface 201, and is configured to enable the deposited-amount current, whose level depends on the amount of particulate matter deposited on the measurement surface 201, to flow between the pair of electrode modules 221 and 231.

The control apparatus 10 is configured to measure the level of the deposited-amount current flowing between the pair of electrode modules 221 and 231 as the level of a current flowing through the pair of measurement wirings 26. This enables the control apparatus 10 to measure the amount of particulate matter deposited on the measurement surface 201 of the sensing member 200 as a function of the measured level of the current flowing through the pair of measurement wirings 26.

A certain amount or more of particulate matter deposited above the measurement surface 201 results in the level of the current flowing through the pair of measurement wirings 26 being kept unchanged at a predetermined constant level. This may make it difficult for the control apparatus 10 to measure a new deposition of particulate matter to the measurement surface 201.

For addressing such a case, the control apparatus 10 is configured to supply electrical power to the heater 211 to cause the heater 211 to generate heat, thus heating the measurement surface 201 of the sensing member 200. This burns the already deposited particulate matter on the measurement surface 201 to thereby remove the already deposited particulate matter from the measurement surface 201. This therefore enables the control apparatus 10 to measure the amount of particulate matter deposited on the refreshed measurement surface from which the already deposited particulate matter has been removed.

Next, the following describes other components of the particulate matter sensor 20 with reference to FIG. 2.

The particulate matter sensor 20 includes, in addition to the sensing member 200 described above, a holder 21, a housing 22, a fastener 23, and covers 24 and 25.

The holder 21 is configured to hold the sensing member 200. The holder 21 is made of ceramic that is insulation material. The holder 21 is disposed through the through hole 131 of the exhaust pipe 130 to hold the sensing member 200 with the measurement surface 201 projecting to the inside space of the exhaust pipe 130.

The housing 22 is made of metal and has a substantially cylindrical tubular shape with an outer circumferential surface. The housing 22 constitutes the outline of a part of the particulate matter sensor 20, and is disposed through the through hole 131 of the exhaust pipe 130 to fixedly surround the holder 21. The housing 22 is comprised of a first portion disposed in the inside space of the exhaust pipe 130, and a second portion disposed in the outside space of the exhaust pipe 130. The first portion of the housing 22 has an end with an opening which a part of the sensing member 200 projects into the inside space of the exhaust pipe 130.

The fastener 23 is configured to fasten the particulate matter sensor 20 to the exhaust pipe 130. Specifically, the fastener 23, which is made of metal, is disposed through the exhaust pipe 130 to fixedly surround the outer circumferential surface of a part of the housing 22.

The fastener 23, which has a cylindrical tubular shape, has an outer circumferential surface on which an unillustrated external, i.e., male, thread member is formed. The through hole 131 of the exhaust pipe 130 has an inner circumferential surface, and has an unillustrated internal, i.e., female, thread member formed on the inner circumferential surface thereof. The external thread member of the fastener 23, which fixedly surround the housing 22 of the particulate matter sensor 20, is meshed with the internal thread member of the through hole 131, resulting in the particulate matter sensor 20 being fixedly fastened to the exhaust pipe 130.

The covers 24 and 25 are attached to the end of the first portion of the housing 22. The covers 24 and 24 constitute a double cover member that doubly covers the projecting part of the sensing member 200 from the opening of the end of the first portion of the housing 22.

The cover 25 constitutes an inner cover of the double cover member, and is disposed to cover an outer periphery of the projecting part of the sensing member 200. The cover 24 constitutes an outer cover of the double cover member, and is disposed to cover the inner cover 25 that covers the outer periphery of the projecting part of the sensing member 200.

Each of the covers 24 and 25 has a plurality of through holes formed therethrough. The through holes formed through the covers 24 and 25 enable a part of the exhaust gas passing through the exhaust pipe to enter the inside of the covers 24 and 25. This results in a part of particulate matter contained in the exhaust gas being deposited on the measurement surface 201 of the sensing member 200, making it possible for the control apparatus 10 to measure the amount of the particulate matter deposited on the measurement surface 201.

The particulate matter sensor 20 has a second part projecting into the outside space of the exhaust pipe 130. The second part of the particulate matter sensor 20 has a projecting end through which the pair of measurement wirings 26 and the pair of power wirings 27, and the sense wiring 28 are penetrated. In FIG. 2, the pair of measurement wirings 26 is bundled to be illustrated as a single wiring, and the pair of power wirings 27 and the sense wiring 28 are bundled to be illustrated as a single wiring.

Referring to FIG. 1, an engine ECU 30 is operative to control operations of the engine 100. The engine ECU 30 is configured as a computer system comprised of, for example, a CPU, a ROM, and a RAM. The engine ECU is operative to control the degree of opening of an unillustrated throttle valve in accordance with driver's inputted operation information to thereby adjust the magnitude of drive power outputted from the engine 100. The engine ECU 30 is additionally operative to control a value of the air-fuel ratio of the engine 100 to thereby reduce the concentration of, for example, nitrogen oxide contained in the exhaust gas as low as possible. These control tasks performed by the engine ECU 30 are similar to those performed by a conventional engine ECU, and therefore more specific descriptions of the above control tasks are omitted.

The control apparatus 10 described in detail hereinafter and the engine ECU 30 are communicable with one another. The engine ECU 30 is programmed to continuously capture values of respective various engine-condition parameters indicative of the operating conditions of the engine 100, such as the rotational speed of the engine 100 and the temperature of the coolant flowing in the engine 100. The control apparatus 10 is operative to communicate with the engine ECU 30 to thereby obtain, from the engine ECU 30, the captured values of the respective engine-condition parameters.

As described above, the control apparatus 10 of the exemplary embodiment is configured to control the particulate matter sensor 20. Like the engine ECU 30, the control apparatus 10 is configured as a computer system comprised of, for example, a CPU, a ROM, and a RAM. Specifically, the control apparatus 10 performs various tasks, one of which is to measure the level of the deposited-amount current related to the deposited amount of particulate matter in the particulate matter sensor 20.

The control apparatus 10 includes, as functional control blocks, a voltage adjuster 11, a temperature obtainer 12, a heater adjuster 13, a condition determiner 14, a deposited-amount calculator 15, and a filter malfunction determiner 16.

At least one or all of the functions of the control apparatus 10 described hereinafter can be installed in the engine ECU 30. That is, the engine ECU 30 can serve as the control apparatus 10 to control the particulate matter sensor 20. On the other hand, at least one or all of the functions of the engine ECU 30 can be installed in the control apparatus 10. How the control apparatus 10 and the engine ECU 30 share their functions is not limited to a specific share. The configuration of each of the control apparatus 10 and the engine ECU 30 is not limited to the configuration of the corresponding one of the control apparatus 10 and the engine ECU 30 described in the exemplary embodiment.

The voltage adjuster 11 is configured to apply the measurement voltage between the pair of electrode modules 221 and 231 while adjusting a level of the measurement voltage applied therebetween. While the measurement voltage is applied between the pair of electrode modules 221 and 231, a part of particulate matter existing around the sensing member 200 becomes charged, so that the charged part of the particulate matter is attracted by electrostatic force between the charged part of the particulate matter and the pair of electrode modules 221 and 231, resulting in the charged part of the particulate matter being adhering to the sensing member 200.

Additionally, as described above, while the voltage is applied between the pair of electrode modules 221 and 231, a current, i.e., a deposited-amount current, may flow between the pair of electrode modules 221 and 231; the level of the deposited-amount current is proportional to the deposited amount of the particulate matter on the measurement surface 201 of the sensing member 200. The deposited-amount current flowing between the pair of electrode modules 221 and 231 represents a signal parameter that is outputted from the particulate matter sensor 20 and that shows the deposited amount of the particulate matter in the sensing member 200.

The voltage adjuster 11 is also configured to perform a task of measuring the level of the deposited-amount current.

The temperature obtainer 12 is configured to obtain the temperature of the sensing member 200. Specifically, the temperature obtainer 12 according to the exemplary embodiment calculates, based on the resistance of the heater 211, the temperature of the sensing member 200 under the assumption that the temperature of the sensing member 200 substantially matches the temperature of the heater 211.

It is wall known that the temperature of the sensing member 200, i.e., the temperature of the heater 211, is proportional to the resistance of the heater 211, so that the higher the temperature of the sensing member 200, i.e., the temperature of the heater 211, the higher the resistance of the heater 211. The correspondence relationship between values of the temperature of the sensing member 200, i.e., the temperature of the heater 211, and values of the resistance of the heater 211 is stored in an unillustrated storage included in the control apparatus 10.

Specifically, the temperature obtainer 12 is configured to measure a value of a voltage, i.e., a heater voltage, applied from the control apparatus 10 to the heater 211 and a value of a current flowing, based on the applied heater voltage, in the heater 211 to thereby calculate a value of the resistance of the heater 211.

Then, the temperature obtainer 12 refers to the correspondence relationship using the calculated value of the resistance of the heater 211 to thereby extract a value of the temperature of the heater 211, i.e., a value of the temperature of the sensing member 200, which corresponds to the calculated value of the resistance of the heater 211.

The temperature obtainer 12 can obtain, through the sense wiring 28, the potential at the connection point CP, and calculate a value of the voltage applied to the heater 211 based on the obtained potential at the connection point CP. Because the temperature obtainer 12 can use one of known calculation methods based on the potential at the connection point CP to thereby calculate a value of the voltage applied to the heater 211, a detailed description of how the temperature obtainer 12 calculates a value of the voltage applied to the heater 211 is omitted.

Alternatively, the temperature obtainer 12 can obtain the temperature of the sensing member 200 using a temperature sensor provided in the particulate matter sensor 20.

The heater adjuster 13, which serves as a component for adjusting the amount of heat generated by the heater 211, is configured to adjust the level of a current, i.e., a heater current, flowing through the heater 211 to thereby cause the temperature of the sensing member 200 obtained by the temperature obtainer 12 to match a predetermined target temperature.

Specifically, the heater adjuster 13 is configured to perform a task, i.e., a regeneration task, of heating the sensing member 200 using the heater 211 to thereby burn the particulate matter adhering to the sensing member 200, thus removing it from the sensing member 200, in other words, eliminating the particulate-matter quantity adhering to the sensing member 200 to be substantially zero.

Additionally, the heater adjuster 13 is configured to perform a task of adjusting the amount of heat generated by the heater 211 to thereby maintain the temperature of the sensing member 200 at the target temperature; the sensing member 20 having the target temperature enables additional particulate-matter deposition on the sensing member 200 to be restricted, i.e., blocked. The target temperature of the sensing member 200, which enables additional particulate-matter deposition on the sensing member 200 to be inhibited, is set to be (i) lower than an execution temperature of the sensing member 200 at which the regeneration task of the sensing member 200 is executed, and (ii) higher than the temperature of the exhaust gas flowing around the particulate matter sensor 20.

While the temperature of the sensing member 200 is maintained at the target temperature, particles of particulate matter existing around the sensing member 200 are subjected to thermophoretic force, resulting in the particles of the particulate matter moving to be away from the sensing member 200. This restricts additional particulate-matter deposition on the sensing member 200.

The target temperature that reduces additional particulate-matter deposition on the sensing member 200 will also be referred to as a deposition reduction temperature. The above task of adjusting the amount of heat generated by the heater 211 to thereby maintain the temperature of the sensing member 200 at the deposition reduction temperature will also be referred to as a deposition reduction task. As described later, the heater adjuster 13 performs the regeneration task, and the deposition reduction task subsequent to the regeneration task.

The condition determiner 14 serves as a component for determining whether the environmental conditions around the particulate matter sensor 20 are stable. The environmental conditions around the particulate matter sensor 20 mean the environmental conditions around the sensing member 200 of the particulate matter sensor 20 in the exhaust pipe 130. The phrase that "the environmental conditions around the particulate matter sensor 20 are stable" is defined to mean that there are small fluctuations in each environmental parameter related to the environmental conditions around the sensing member 200, so that each environmental parameter is stable. In particular, the environmental parameters, each of which is related to the environmental conditions around the particulate matter sensor 20, have an influence on the output of the particulate matter sensor 20, i.e., the deposited-amount current flowing between the pair of electrode modules 221 and 231.

The environmental parameters, for example, include the rotational speed of the engine 100, the flow rate of the exhaust gas flowing in the exhaust pipe 130, and/or the temperature of the exhaust gas. The environmental parameters may include an estimated concentration of the particulate matter contained in the exhaust gas; the estimated concentration of the particulate matter contained in the exhaust gas can be calculated based on the parameters of (i) the rotational speed of the engine 100, (ii) the flow rate of the exhaust gas flowing in the exhaust pipe 130, and (iii) the temperature of the exhaust gas.

A specific example about how the condition determiner 14 determines whether the environmental conditions around the particulate matter sensor 20 are stable will be described later.

The deposited-amount calculator 15 serves as a component for calculating the amount of particulate matter estimated to be deposited on the sensing member 200. The amount of particulate matter estimated to be deposited on the sensing member 200, which will also be referred to as an estimate of particulate matter deposited on the sensing member 200, represents the amount of particulate matter that is estimated to be deposited on the sensing member 200 of the particulate matter sensor 20 on assumption that there is a malfunction in the particulate filter 110 at present. For example, the deposited-amount calculator 15 can perform, for example, simulation of the amount of particulate matter on the sensing member 200 based on a present value of the flow rate of the exhaust gas, a present value of the temperature of the exhaust gas, and the operating conditions of the engine 100 to thereby calculate an estimate of particulate matter deposited on the sensing member 200.

The deposited-amount calculator 15 is configured to perform a calculation task of calculating an estimate of particulate matter deposited on the sensing member 200 every predetermined control period. This results in the calculated estimates of particulate matter deposited on the sensing member 200 increasing over time. The deposited-amount calculator 15 can employ one of known methods of calculating estimates of particulate matter deposited on the sensing member 200, such as the method disclosed in Japanese Patent Application Publication No. 2012-122399, and therefore a detailed description of how the deposited-amount calculator 15 calculates estimates of particulate matter deposited on the sensing member 200 is omitted.

The filter malfunction determiner 16 serves as a component for determining whether there is a malfunction in the particulate filter 110. The filter malfunction determiner 16 is configured to perform a determination task of determining whether there is a malfunction in the particulate filter 110 in accordance with a calculated estimate of particulate matter deposited on the sensing member 200 and the deposited-amount current flowing between the pair of electrode modules 221 and 231. The determination task will be described in detail later.

Figure 5:
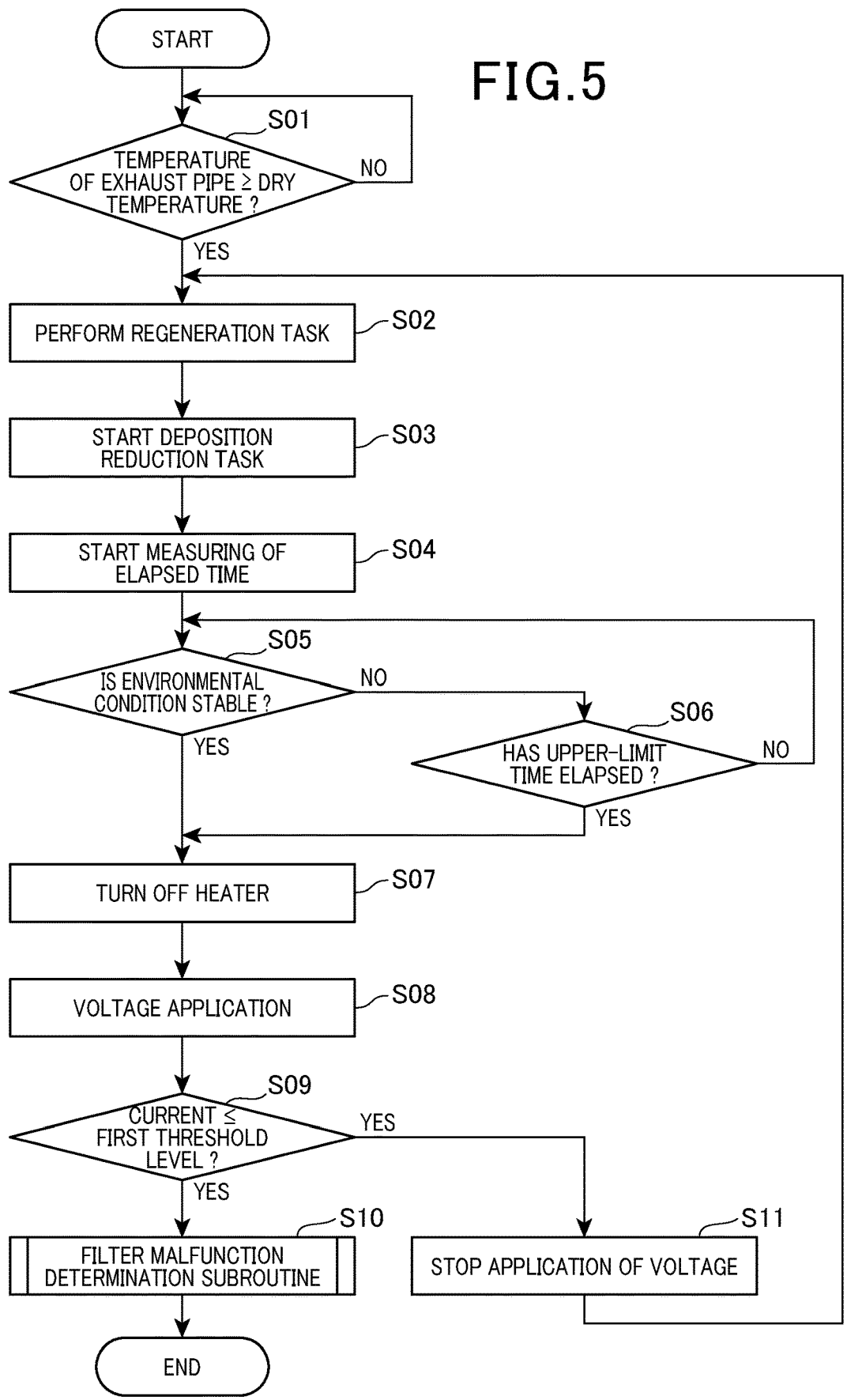
FIG. 5 is a flowchart schematically illustrating the flow of operations of a filter diagnostic routine carried out by the control apparatus according to the exemplary embodiment.

Next, the following describes the flow of operations of a filter diagnostic routine carried out by the control apparatus 10 with reference to FIG. 5. The control apparatus 10 is programmed to start execution of the filter diagnostic routine immediately in response to the start-up of the engine 100 for determining whether the particulate filter 110 is functioning normally.

When starting execution of the filter diagnostic routine, the control apparatus 10 determines whether the temperature of the exhaust pipe 130 is higher than or equal to a predetermined dry temperature in step S01 of FIG. 5. The dry temperature is defined as a sufficiently high temperature such that, if the temperature of the exhaust pipe 130 is higher than or equal to the dry temperature, no liquid water exists in the exhaust pipe 130.

When determining that the temperature of the exhaust pipe 130 is lower than the dry temperature (NO in step S01), the control apparatus 10 repeats the determination in step S01. Otherwise, determining that the temperature of the exhaust pipe 130 is higher than or equal to the dry temperature (YES in step S01), the control apparatus 10 performs the operation in step S02.

Specifically, the control apparatus 10 serves as the heater adjuster 13 to perform the regeneration task in step S02. As described above, the regeneration task heats the sensing member 200 using the heater 211 to thereby burn the particulate matter adhering to the sensing member 200, thus removing it from the sensing member 200. At the timing when the regeneration task is completed, the particulate-matter quantity adhering to the sensing member 200 is substantially zero.

After completion of the regeneration task in step S02, the control apparatus 10 serves as the heater adjuster 13 to start execution of the deposition reduction task in step S03. The deposition reduction task is configured to, as described above, maintain the temperature of the sensing member 200 at one of the deposition reduction temperatures that enable additional particulate-matter deposition on the sensing member 200 to be restricted.

Figure 6:
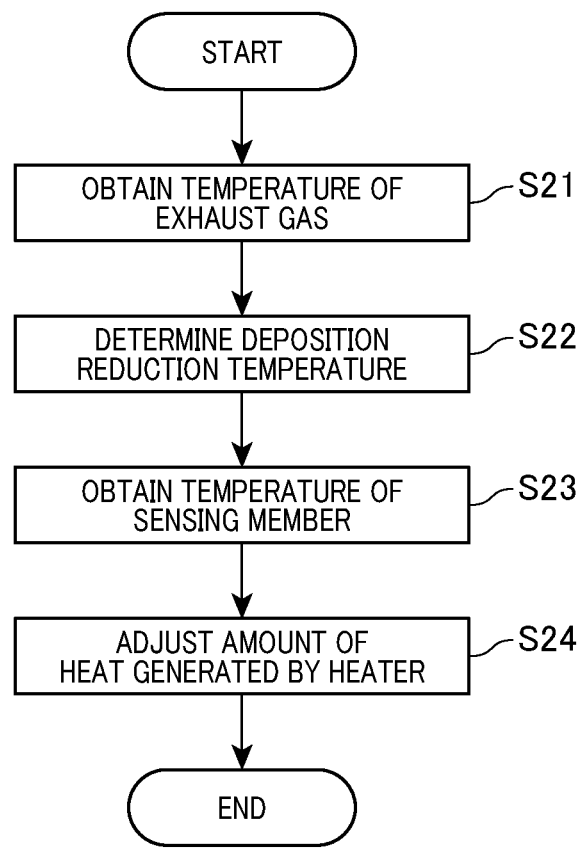
FIG. 6 is a flowchart schematically illustrating the flow of operations of a deposition reduction subroutine carried out by the control apparatus according to the exemplary embodiment.

As the deposition reduction task in step S03, the control apparatus 10 is programmed to repeatedly perform a subroutine, i.e., a deposition reduction subroutine, illustrated in FIG. 6. In other words, the control apparatus 10 is programmed to repeatedly perform the deposition reduction subroutine illustrated in FIG. 6 in response to the start of execution of the deposition reduction task in step S03. The deposition reduction subroutine, i.e., the deposition reduction task, is designed to determine the deposition reduction temperature as the target temperature of the deposition reduction task, and cause the temperature of the sensing member 200 to match the deposition reduction temperature.

When starting the deposition reduction subroutine, i.e., the deposition reduction task, the control apparatus 10 obtains, from the exhaust temperature sensor 120, the temperature of the exhaust gas measured by the exhaust temperature sensor 120 in step S21 of FIG. 6. The temperature of the exhaust gas represents the temperature of a part of the exhaust gas; the part of the exhaust gas is flowing around the particulate matter sensor 20.

Following the operation in step S21, the control apparatus 10 determines, in step S22, the deposition reduction temperature that is (i) lower than the execution temperature of the sensing member 200 at which the regeneration task of the sensing member 200 is executed, and (ii) higher, by a predetermined temperature value, than the temperature of the exhaust gas obtained in step S21.

Subsequent to the operation in step S22, the control apparatus 10 serves as the temperature obtainer 12 to obtain a present value of the temperature of the sensing member 200 in step S23. Next, the control apparatus 10 serves as the heater adjuster 13 to adjust, in step S24, the amount of heat generated by the heater 211 to thereby cause the present value of the temperature of the sensing member 200 obtained in step S23 to approach the deposition reduction temperature determined in step S22. For example, the control apparatus 10 can perform one of known control tasks, such as a PID control task, to thereby adjust the amount of heat generated by the heater 211 such that the present value of the temperature of the sensing member 200 obtained in step S23 approaches the deposition reduction temperature determined in step S22.

The repeated execution of the deposition reduction task results in the temperature of the sensing member 200 substantially matching the deposition reduction temperature.

Referring to FIG. 5, following the start of executing the deposition reduction task in step S03, the filter diagnostic routine proceeds to step S04. The following operation in step S04 and the subsequent operations of the filter diagnostic routine are carried out while the deposition reduction subroutine illustrated in FIG. 6 is continuously carried out, so that the temperature of the sensing member 200 is substantially maintained at the deposition reduction temperature.

In step S04, the control apparatus 10 performs an elapsed-time measuring task of measuring an elapsed time since the start timing of the deposition reduction task; the elapsed time measured by the elapsed-time measuring task is used to determine whether the environmental conditions around the particulate matter sensor 20 are stable in subsequent step S05.

Figure 7:
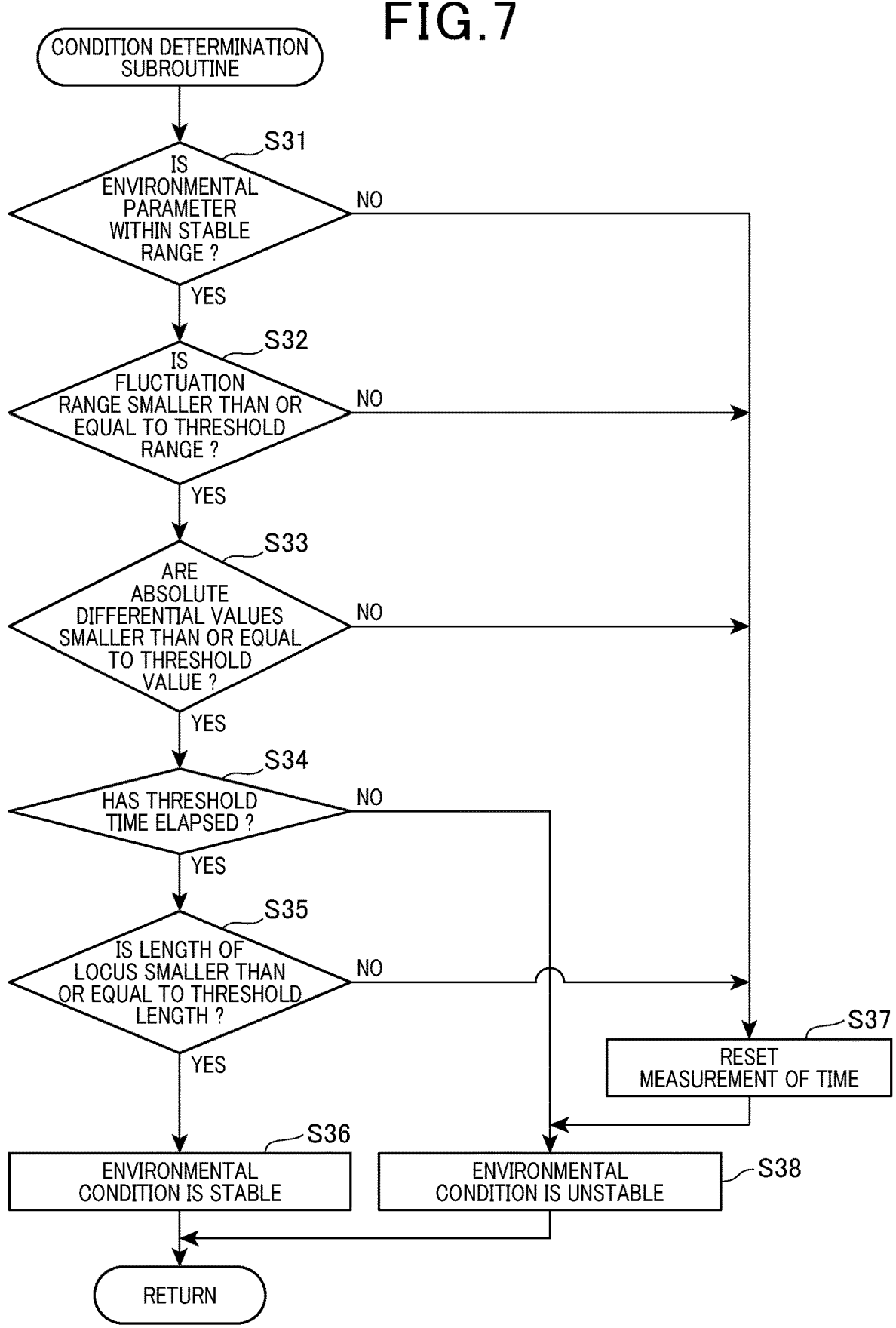
FIG. 7 is a flowchart schematically illustrating the flow of operations of a condition determination subroutine carried out by the control apparatus according to the exemplary embodiment.

Following the operation in step S04, the control apparatus 10 serves as the condition determiner 14 to perform a condition determination subroutine that determines whether the environmental conditions around the particulate matter sensor 20 are stable in step S05. Detailed operations in the condition determination subroutine in step S05 are illustrated as a flowchart in FIG. 7. The flowchart illustrated in FIG. 7 shows the flow of the operations in the condition determination subroutine. The control apparatus 10 is programmed to repeatedly perform the condition determination subroutine illustrated in FIG. 7 each time the filter diagnostic routine proceeds to step S05.

In step S31 of the condition determination subroutine, the control apparatus 10 determines whether one or more sampled values of a selected one of the environmental parameters, which have an influence on the deposited-amount current flowing between the pair of electrode modules 221 and 231, are within a stable range previously determined for the selected one of the environmental parameters.

For example, the control apparatus 10 of the exemplary embodiment selects, as one of the environmental parameters, the temperature of the exhaust gas, and determines whether sampled values of the temperature of the exhaust gas are within the stable range determined beforehand for the temperature of the exhaust gas. As described above, the control apparatus 10 of the exemplary embodiment can select, as at least one of the environmental parameters, at least one of (i) the temperature of the exhaust gas, (ii) the rotational speed of the engine 100, (iii) the flow rate of the exhaust gas flowing in the exhaust pipe 130, and (iv) the estimated concentration of the particulate matter contained in the exhaust gas.

The stable range determined beforehand for each of the environmental parameters can be designed as a range between a predetermined lower limit and a predetermined upper limit inclusive, a range from a predetermined lower limit, or a range from a predetermined upper limit. For example, if the temperature of the exhaust gas is selected as the at least one of the environmental parameters used in the determination of step S31, a stable range including only an upper limit for the temperature of the exhaust gas can be determined.

If the sampled values of the selected environmental parameter are determined to be within the stable range determined beforehand for the selected environmental parameter (YES in step S31), the condition determination subroutine proceeds to step S32.

In step S32, the control apparatus 10 determines whether a fluctuation range of the selected environmental parameter is smaller than or equal to a predetermined threshold range for the selected environmental parameter. The predetermined threshold range for each environmental parameter is previously determined to be smaller than the predetermined stable range previously determined therefor. Specifically, the control apparatus 10 is programmed to analyze the waveform of the temporarily fluctuating sampled values of the selected environmental parameter, which have been sampled until now since the start of measuring the elapsed time in step S04, to thereby determine whether the fluctuation range of the selected environmental parameter has exceeded the predetermined threshold range.

If the fluctuation range of the selected environmental parameter is determined to be smaller than or equal to the predetermined threshold range (YES in step S32), the condition determination subroutine proceeds to step S33.

In step S33, the control apparatus 10 determines whether absolute differential values of the selected environmental parameter are smaller than or equal to a predetermined threshold value for the selected environmental parameter. Specifically, the control apparatus 10 is programmed to analyze the waveform of the temporarily fluctuating sampled values of the selected environmental parameter, which have been sampled until now since the start of measuring the elapsed time in step S04, to thereby determine whether the absolute differential values of the selected environmental parameter has exceeded the predetermined threshold value.

If the absolute differential values of the selected environmental parameter are determined to be smaller than or equal to the predetermined threshold value (YES in step S33), the condition determination subroutine proceeds to step S34.

In step S34, the control apparatus 10 determines, based on the measured elapsed time, whether a predetermined threshold time has elapsed until now since the start of measuring the elapsed time in step S04. Upon determination that the predetermined threshold time has elapsed until now since the start of measuring the elapsed time in step S04 (YES in step S34), the condition determination subroutine proceeds to step S35.

In step S35, the control apparatus 10 determines whether the length of the locus of the selected environmental parameter is smaller than or equal to a predetermined threshold length. That is, if the sampled values of the selected environmental parameter are plotted as a graph, the graph of the sampled values of the selected environmental parameter has a curved waveform, so that the locus of the selected environmental parameter is defined as the length of the curved waveform of the graph of the sampled values of the selected environmental parameter. More accurately, the graph of the sampled values of the selected environmental parameter is a graph of the temporarily fluctuating sampled values of the selected environmental parameter, which have been sampled for the predetermined threshold time used in step S34 since the start of measuring the elapsed time in step S04. Specifically, the control apparatus 10 is programmed to analyze the waveform of the temporarily fluctuating sampled values of the selected environmental parameter, which have been sampled until now since the start of measuring the elapsed time in step S04, to thereby determine whether the length of the locus of the selected environmental parameter is longer than the predetermined threshold length.

If the length of the locus of the selected environmental parameter is smaller than or equal to the predetermined threshold length (YES in step S35), the condition determination subroutine proceeds to step S36.

In step S36, the control apparatus 10 determines that the environmental conditions around the particulate matter sensor 20 are stable in step S36, i.e., YES in step S05, and thereafter the condition determination subroutine returns to step S07 of the filter diagnostic routine.

Otherwise, upon determination that the predetermined threshold time has not elapsed until now since the start of measuring the elapsed time in step S04 (NO in step S34), the control apparatus 10 determines that the environmental conditions around the particulate matter sensor 20 are unstable in step S38, i.e., NO in step S05, and thereafter the condition determination subroutine returns to step S06 of the filter diagnostic routine.

In addition, otherwise if at least one of the sampled values of the selected environmental parameter is determined to be outside the stable range determined beforehand for the selected environmental parameter (NO in step S31), the condition determination subroutine goes to step S37. Similarly, otherwise if the fluctuation range of the selected environmental parameter is determined to be larger than the predetermined threshold range (NO in step S32), the condition determination subroutine goes to step S37. Additionally, otherwise if at least one the absolute differential values of the selected environmental parameter is determined to be larger than the predetermined threshold value (NO in step S33), the condition determination subroutine goes to step S37.

In step S37, the control apparatus 10 resets the elapsed time, measurement of which has been started in step S04 of the filter diagnostic routine, to zero, and restarts the elapsed-time measuring task of measuring an elapsed time since the restart timing of the deposition reduction task, so that the determination in step S34 is carried out based on the elapsed time since the restart timing in step S37.

After the operation in step S37, the condition determination subroutine goes to step S38.

If the environmental conditions around the particulate matter sensor 20 are stable in step S36, i.e., YES in step S05, the filter diagnostic routine proceeds to step S07 set forth above. Otherwise, if the environmental conditions around the particulate matter sensor 20 are unstable in step S38, i.e., NO in step S05, the filter diagnostic routine proceeds to step S06 set forth above.

In step S06, the control apparatus 10 determines whether a predetermined upper-limit time has elapsed until now since the start of measuring the elapsed time in step S04. The predetermined upper-limit time is set to be longer than the predetermined threshold time used in step S34.

Note that, even if the elapsed time that has been measured until now since the start of measuring the elapsed time in step S04 was reset in step S37 of FIG. 7, the control apparatus 10 uses the timing of starting measurement of the elapsed time in step S04 as a starting point of the lapse of the predetermined upper-limit time. That is, the control apparatus 10 determines whether the predetermined upper-limit time has elapsed until now since the start of measuring the elapsed time in step S04 independently of the measured elapsed time being reset or not.

Upon determination that the predetermined upper-limit time has not elapsed until now since the start of measuring the elapsed time in step S04 (NO in step S06), the control apparatus 10 performs the determination in step S05, i.e., the condition determination subroutine illustrated in FIG. 7 again.

Otherwise, upon determination that the predetermined upper-limit time has elapsed until now since the start of measuring the elapsed time in step S04 (YES in step S06), the filter diagnostic routine forcibly proceeds to step S07 independently of whether the environmental conditions around the particulate matter sensor 20 are determined to be stable.

In step S07, the control apparatus 10 serves as the heater adjuster 13 to stop the heater 211 from generating heat. This results in the temperature of the sensing member 200 being not maintained at the deposition reduction temperature, leading to termination of the deposition reduction task. Note that, even if the deposition reduction task is terminated, the condition determination subroutine illustrated in FIG. 7 is repeatedly performed.

Following the operation in step S07, the control apparatus 10 serves as the voltage adjuster 11 to start application of the measurement voltage between the pair of electrode modules 221 and 231 in step S08. The control apparatus 10 can be programmed to wait for lapse of a predetermined time after completion of the operation in step S07; the predetermined time is needed for the temperature of the sensing member 200 to become a substantially constant value. In response to lapse of the predetermined time after completion of the operation in step S07, the control apparatus 10 can be programmed to perform the operation in step S08.

Following the operation in step S08, the control apparatus 10 determines whether the level of the deposited-amount current flowing between the pair of electrode modules 221 and 231 is lower than or equal to a predetermined first threshold level in step S09.

Upon determination that the level of the deposited-amount current flowing between the pair of electrode modules 221 and 231 is higher than the predetermined first threshold level (NO in step S09), the filter diagnostic routine shifts to step S11.

The shift of the filter diagnostic routine to step S11 shows the occurrence of a phenomenon that, immediately after application of the measurement voltage between the pair of electrode modules 221 and 231, the deposited-amount current, whose level is higher than the predetermined first threshold level, is flowing through the pair of electrode modules 221 and 231 although the deposited amount of particulate matter on the sensing member 200 is substantially zero. This enables the control apparatus 10 to estimate that insufficient execution of the regeneration task in step S02 causes an unburned part of particulate matter to be left on the sensing member 200.

In response to the estimation, the control apparatus 10 serves as the voltage adjuster 11 to stop application of the measurement voltage between the pair of electrode modules 221 and 231 in step S11, and perform the operation in step S02 and the subsequent operations again. That is, the control apparatus 10 serves as the heater adjuster 13 to perform the regeneration task again to thereby try complete removal of the leftover particulate matter from the sensing member 200. If the re-execution of the regeneration task removes the leftover particulate matter deposited on the sensing member 200, the determination in step S09 after the re-execution of the regeneration task is affirmative, so that the filter diagnostic routine shifts to step S10.

Otherwise, upon determination that the level of the deposited-amount current flowing between the pair of electrode modules 221 and 231 is lower than or equal to the predetermined first threshold level (YES in step S09), the filter diagnostic routine shifts to step S10.

Figure 8:
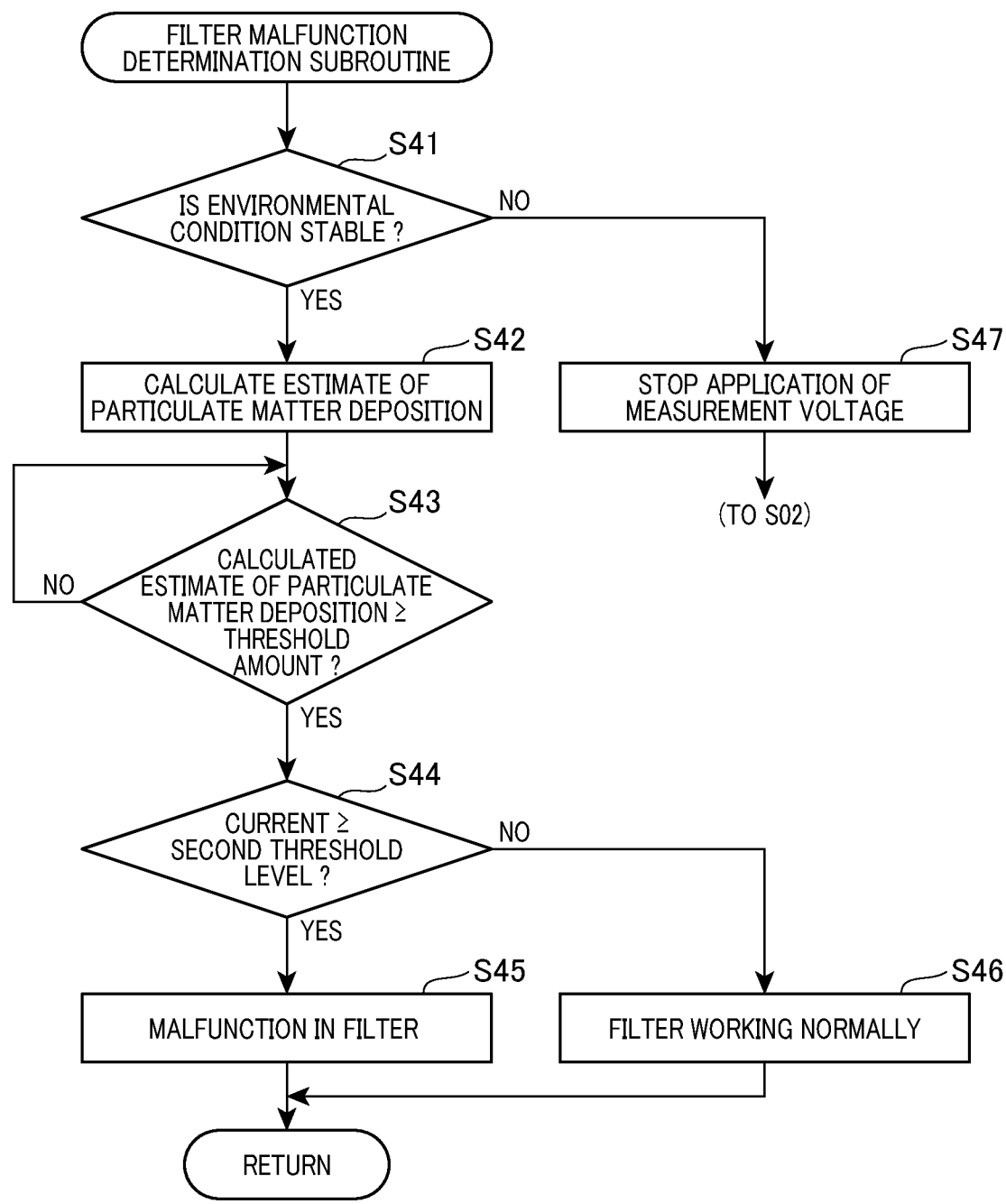
FIG. 8 is a flowchart schematically illustrating the flow of operations of a filter malfunction determination subroutine carried out by the control apparatus according to the exemplary embodiment.

In step S10, the control apparatus 10 performs a filter malfunction determination subroutine to deter mine whether there is a malfunction in the particulate filter 110. Detailed operations in the filter malfunction determination subroutine in step S10 are illustrated as a flowchart in FIG. 8. The flowchart illustrated in FIG. 8 shows the flow of the operations in the filter malfunction determination subroutine.

When starting the filter malfunction determination subroutine, the control apparatus 10 serves as the condition determiner 14 to determine whether the environmental conditions around the particulate matter sensor 20 are stable in step S41. As described above, even if the deposition reduction task is terminated, the condition determination subroutine illustrated in FIG. 7 is repeatedly performed after the operation in step S05 of the filter diagnostic routine is carried out. This enables the control apparatus 10 to determine whether the environmental conditions around the particulate matter sensor 20 are stable based on the result of the condition determination subroutine carried out by the condition determiner 14 in step S41.

Upon determination that the environmental conditions around the particulate matter sensor 20 are stable (YES in step S41), the filter malfunction determination subroutine proceeds to step S42.

In step S42, the control apparatus 10 serves as the deposited-amount calculator 15 to perform the calculation task of calculating, based on the present value of the temperature of the exhaust gas and the operating conditions of the engine 100, an estimate of particulate matter deposited on the sensing member 200 on assumption that there is a malfunction in the particulate filter 110 at present.

Next, the control apparatus 10 serves as the filter malfunction determiner 16 to determine whether the calculated estimate of particulate matter deposited on the sensing member 200 is larger than or equal to a predetermined threshold amount in step S43. The predetermined threshold amount is determined beforehand as a deposited quantity of particulate matter on the measurement surface 201, which enables a measurable current, i.e., a deposited-amount current, to start flowing between the pair of electrode modules 221 and 231.

Upon determination that the calculated estimate of particulate matter deposited on the sensing member 200 is smaller than the predetermined threshold amount (NO in step S43), the control apparatus 10 returns to repeatedly perform the operation in step S41 and the subsequent operations again.

Otherwise, upon determination that the calculated estimate of particulate matter deposited on the sensing member 200 is larger than or equal to the predetermined threshold amount (YES in step S43), the filter malfunction determination subroutine proceeds to step S44.

In step S44, the control apparatus 10 determines whether the level of the deposited-amount current flowing between the pair of electrode modules 221 and 231 is higher than or equal to a predetermined second threshold level. The predetermined second threshold level is determined beforehand as a predicted level of the deposited-amount current flowing between the pair of electrode modules 221 and 231 if the actual amount of particulate matter deposited on the sensing member 200 matches the predetermined threshold amount. The predetermined second threshold level can be identical to or different from the predetermined first threshold level.

Upon determination that the level of the deposited-amount current flowing between the pair of electrode modules 221 and 231 is higher than or equal to the predetermined second threshold level (YES in step S44), the filter malfunction determination routine shifts to step S45. The shift of the filter malfunction determination routine to step S45 shows that an actual amount of particulate matter deposited on the sensing member 200 matches, in a case where there is a malfunction in the particulate filter 110, a predetermined amount, i.e., a predetermined filter-malfunctioning amount, or more of particulate matter deposited on the sensing member 200. This therefore enables the control apparatus 10 to determine that there is a malfunction in the particulate filter 110 in step S45.

Otherwise, upon determination that the level of the deposited-amount current flowing between the pair of electrode modules 221 and 231 is lower than the predetermined second threshold level (NO in step S44), the filter malfunction determination routine shifts to step S46. The shift of the filter malfunction determination routine to step S46 shows that only an actual amount of particulate matter, which is smaller than the predetermined filter-malfunctioning amount of particulate matter, is deposited on the sensing member 200. This therefore enables the control apparatus 10 to determine that the particulate filter 110 is functioning normally in step S46.

Otherwise, upon determination that the environmental conditions around the particulate matter sensor 20 are unstable (NO in step S41), the filter malfunction determination subroutine proceeds to step S47. In step S47, the control apparatus 10 serves as the voltage adjuster 11 to stop application of the measurement voltage between the pair of electrode modules 221 and 231, and perform the operation in step S02 and the subsequent operations again.

The following describes advantageous benefits achieved by execution of the filter diagnostic routine.

As described above, the control apparatus 10 of the exemplary embodiment serves as the heater adjuster 13 to perform the regeneration task (see step S02 of FIG. 5) that heats the sensing member 200 using the heater 211 to thereby burn the particulate matter adhering to the sensing member 200, thus removing it from the sensing member 200. The control apparatus 10 also serves as the heater adjuster 13 to perform, for a predetermined duration, the deposition reduction task to maintain the temperature of the sensing member 200 at one of the deposition reduction temperatures that reduce additional particulate-matter deposition on the sensing member 200. The predetermined duration is defined from the timing when the regeneration task is completed in step S03 to the timing when the environmental conditions around the particulate matter sensor 20 are determined to be stable in step S05.

Upon determination that the environmental conditions around the particulate matter sensor 20 are stable in step S05, the control apparatus 10 serves as the heater adjuster 13 to stop the heater 211 from generating heat. Thereafter, the control apparatus 10 serves as the voltage adjuster 11 to start application of the measurement voltage between the pair of electrode modules 221 and 231 in step S08.

The above configuration of the control apparatus 10 performs the deposition reduction task for the predetermined duration that is defined from the timing when the regeneration task is completed to the timing when the environmental conditions around the particulate matter sensor 20 are determined to be stable. The configuration of the control apparatus 10 prevents a new additional deposition of particulate matter to the sensing member 200 during the predetermined duration. This enables the sensing member 200 to be maintained in a refreshed state at the timing when the regeneration task for the sensing member 200 is completed, i.e., in the refreshed state where the particulate-matter quantity adhering to the sensing member 200 is substantially zero.

Thereafter, when the environmental conditions around the particulate matter sensor 20 are determined to be stable, the configuration of the control apparatus 10 starts application of the measurement voltage between the pair of electrode modules 221 and 231, and calculates estimates of particulate matter deposited on the sensing member 200. Based on one of the calculated estimates of particulate matter deposited on the sensing member 200, the configuration of the control apparatus 10 determines whether there is a malfunction in the particulate filter 110.

The configuration of the control apparatus 10 eliminates the need of performing the regeneration task after the environmental conditions around the particulate matter sensor 20 become stable. This results in an increase in the possibility of, while the environmental conditions around the particulate matter sensor 20 are maintained to be stable, accurately calculating estimates of particulate matter deposited on the sensing member 200 and completing, based on one of the calculated estimates, reliable malfunction determination of the particulate filter 110.

Figure 10:
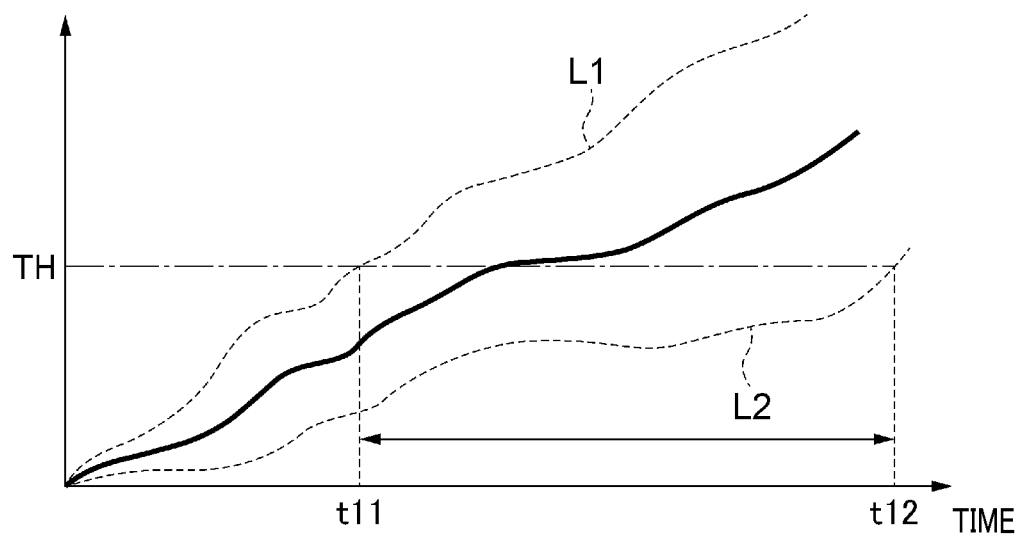
FIG. 10 is a graph used for describing the accuracy of calculating, by a control apparatus of a comparative example, estimates of particulate-matter deposition.

FIG. 10 is a graph schematically illustrating how estimates of particulate matter deposited on the sensing member 200 are changed over time; the estimates are calculated using a conventional estimate calculation method carried out by the control apparatus 10 according to a comparative example.

Specifically, the conventional method performs application of the measurement voltage after completion of the regeneration task independently of whether the environmental conditions around the particulate matter sensor 20 are stable, and calculates estimates of particulate matter deposited on the sensing member 200 in accordance with respective measured current values.

In particular, the graph of FIG. 10 illustrates a solid curve indicative of change of actual amounts of particulate matter deposited on the sensing member 200 if the environmental conditions around the particulate matter sensor 20 are unstable. FIG. 10 clearly shows that gradients at the respective actual amounts of the solid curve illustrated in the graph are changed over time, so that the solid curve indicative of the actual amounts of particulate matter deposited on the sensing member 200 has a complicated waveform.

Because the solid curve of the actual amounts of particulate matter deposited on the sensing member 200 obtained by the above conventional method has a complicated shape, it may be difficult to accurately calculate estimates accurately matching the respective actual amounts of particulate matter deposited on the sensing member 200.

Additionally, FIG. 10 shows that there are large variations of the estimates of particulate matter deposited on the sensing member 200 between both dashed curves L1 and L2. This may be likely to cause a large error between each calculated estimate of particulate matter deposited on the sensing member 200 and a corresponding one of actual amounts of particulate matter deposited on the sensing member 200.

FIG. 10 also illustrates the predetermined threshold amount used in the determination of step S43 to which reference character TH is assigned. That is, the predetermined threshold amount TH represents the deposited quantity of particulate matter on the sensing member 200, which enables the deposited-amount current, i.e., the measurable current, to start flowing between the pair of electrode modules 221 and 231.

Specifically, when a calculated estimate of particulate matter deposited on the sensing member 200 has just exceeded the predetermined threshold amount TH at a time, which will be referred to as a malfunction determination time, the malfunction determination of the particulate filter 110 is carried out based on a level of the deposited-amount current measured at the malfunction determination time.

As illustrated in FIG. 10, however, because the calculated estimates of particulate matter deposited on the sensing member 200 greatly vary between the dashed curves L1 and L2, there are variable malfunction determination times, at each of which a corresponding one of the calculated estimates of particulate matter deposited on the sensing member 200 has just exceeded the predetermined threshold amount TH; the variable malfunction determination times are within a predetermined range between a predetermined first time t11 and a predetermined second time t12 (see FIG. 10).

It may be therefore difficult to perform the malfunction determination of the particulate filter 110 based on a proper level of the deposited-amount current measured at a selected one of the variable malfunction determination times; the selected one of the variable malfunction determination times accurately matches a time at which a corresponding one of the actual amounts of particulate matter deposited on the sensing member 200 has just exceeded the predetermined threshold amount TH. This may result in an increase in the possibility of erroneous determination of whether there is a malfunction in the particulate filter 110.

Figure 9:
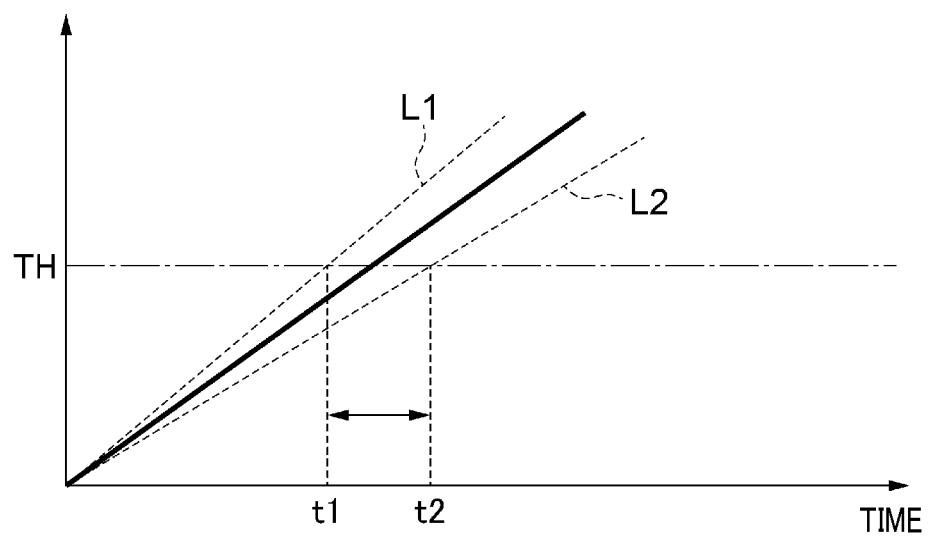
FIG. 9 is a graph used for describing the accuracy of calculating, by the control apparatus of the exemplary embodiment, estimates of particulate-matter deposition.

In contrast, FIG. 9 is a graph schematically illustrating how estimates of particulate matter deposited on the sensing member 200 are changed over time; the estimates are calculated using the method of calculating the estimates of particulate matter deposited on the sensing member 200 according to the exemplary embodiment described above.

Specifically, the method performs, in response to determination that the environmental conditions around the particulate matter sensor 20 are stable after completion of the regeneration task, application of the measurement voltage between the pair of electrode modules 221 and 231 without execution of the regeneration task, and calculates estimates of particulate matter deposited on the sensing member 200 in accordance with respective measured levels of the deposited-amount current.

In particular, the graph of FIG. 9 illustrates a solid curve indicative of change of actual amounts of particulate matter deposited on the sensing member 200 while the environmental conditions around the particulate matter sensor 20 are stable. q FIG. 9 clearly shows that gradients at the respective actual amounts of the solid curve illustrated in the graph substantially have a constant value. Although FIG. 9 shows that there are variations of the estimates of particulate matter deposited on the sensing member 200 between both dashed curves L1 and L2, the variation width between the dashed curves L1 and L2 illustrated in FIG. 9 according to the exemplary embodiment is smaller than that between the dashed curves L1 and L2 illustrated in FIG. 10 according to the comparative example.

The method of calculating the estimates of particulate matter deposited on the sensing member 200 according to the exemplary embodiment therefore makes narrower the variation range, which is illustrated as the range between times t1 and t2 in FIG. 10, of the variable malfunction determination times at each of which a corresponding one of the calculated estimates of particulate matter deposited on the sensing member 200 has just exceeded the predetermined threshold amount TH.

This results in an increase in the possibility of proper determination of whether there is a malfunction in the particulate filter 110 based on a proper level of the deposited-amount current measured at a selected one of the variable malfunction determination times; the selected one of the variable malfunction determination times accurately matches a time at which a corresponding one of the actual amounts of particulate matter deposited on the sensing member 200 has just exceeded the predetermined threshold amount TH. This therefore makes it possible to reduce the possibility of erroneous determination of whether there is a malfunction in the particulate filter 110.

The heater adjuster 13 of the exemplary embodiment is configured to, as described above with reference to FIG. 6, determine, as the deposition reduction temperature that is the target temperature of the deposition reduction task, a temperature higher, by the predetermined temperature value, than the temperature of a part of the exhaust gas; the part of the exhaust gas is flowing around the particulate matter sensor 20.

This determination of the deposition reduction temperature causes particles of particulate matter existing around the sensing member 200 to be subjected to thermophoretic force, resulting in the particles of the particulate matter moving to be away from the sensing member 200. This reliably restricts additional particulate-matter deposition on the sensing member 200.

The temperature of the part of the exhaust gas flowing around the particulate matter sensor 20 flowing around the particulate sensor 20 may temporarily increase due to, for example, regeneration of the particulate filter 110. It is possible to determine, based on a variation range of the temperature of the exhaust gas, a value of the deposition reduction temperature, which is higher than the upper limit of the variation range of the temperature of the exhaust gas. This determination however may cause unnecessary power consumption of the heater 211 to increase.

From this viewpoint, the heater adjuster 13 of the exemplary embodiment is configured to, as described above with reference to FIG. 6, change the deposition reduction temperature in accordance with the temperature of the part of the exhaust gas; the part of the exhaust gas is flowing around the particulate matter sensor 20. This configuration maintains the deposition reduction temperature to be always higher than the temperature of the part of the exhaust gas while reducing the deposition reduction temperature to be close to the temperature of the part of the exhaust gas.

The condition deter miner 14 of the exemplary embodiment is configured to, as described above with reference to FIG. 7, determine that the environmental conditions around the particulate matter sensor 20 are stable in response to determination that the sampled values of a selected environmental parameter, which has an influence on the output of the particulate matter sensor 20, are within the stable range for the predetermined threshold time, that is, in response to both affirmative deter urinations in steps S31 and S34.

This configuration enables reliable determination of whether the environmental conditions around the particulate matter sensor 20 are stable, making it possible to therefore accurately calculate the estimates of particulate matter deposited on the sensing member 200.

In particular, the condition determiner 14 is configured to determine that the environmental conditions around the particulate matter sensor 20 are stable in response to determination that 1. The sampled values of a selected environmental parameter, which has an influence on the output of the particulate matter sensor 20, are within the stable range for the predetermined threshold time (see YES in each of steps S31 and S34)

2. The fluctuation range of the selected environmental parameter is smaller than or equal to the predetermined threshold range for the predetermined threshold time (YES in step S32)

This configuration makes it possible to determine, even if the sampled values of the selected environmental parameter are within the stable range, that the environmental conditions around the particulate matter sensor 20 are unstable in response to determination that the fluctuation range of the selected environmental parameter becomes larger than the predetermined threshold range for the predetermined threshold time.

This configuration makes stricter the conditions that the environmental conditions around the particulate matter sensor 20 are stable. This therefore enables more accurate calculation of the estimates of particulate matter deposited on the sensing member 200.

Additionally, the condition determiner 14 is configured to determine that the environmental conditions around the particulate matter sensor 20 are stable in response to determination that 1. The sampled values of a selected environmental parameter, which has an influence on the output of the particulate matter sensor 20, are within the stable range for the predetermined threshold time (see YES in each of steps S31 and S34)

2. The absolute differential values of the selected environmental parameter are smaller than or equal to the predetermined threshold value (YES in step S33)

This configuration makes it possible to determine, even if the sampled values of the selected environmental parameter are within the stable range, that the environmental conditions around the particulate matter sensor 20 are unstable in response to determination that at least one of the absolute differential values of the selected environmental parameter becomes larger than the predetermined threshold value.

This configuration makes more stricter the conditions that the environmental conditions around the particulate matter sensor 20 are stable. This therefore enables still more accurate calculation of the estimates of particulate matter deposited on the sensing member 200.

Moreover, the condition determiner 14 is configured to determine that the environmental conditions around the particulate matter sensor 20 are stable in response to determination that 1. The sampled values of a selected environmental parameter, which has an influence on the output of the particulate matter sensor 20, are within the stable range for the predetermined threshold time (see YES in each of steps S31 and S34)

2. The length of the locus of the waveform, which represents temporarily fluctuating sampled values of the environmental parameter, is smaller than or equal to the predetermined threshold length (YES in step S35)

This configuration makes it possible to determine, even if the sampled values of the selected environmental parameter are within the stable range, that the environmental conditions around the particulate matter sensor 20 are unstable in response to determination that the length of the locus of the selected environmental parameter becomes larger than the predetermined threshold length.

This configuration makes further stricter the conditions that the environmental conditions around the particulate matter sensor 20 are stable. This therefore enables still further accurate calculation of the estimates of particulate matter deposited on the sensing member 200.

The voltage adjuster 11 is configured to, after start of application of the measurement voltage between the pair of electrode modules 221 and 231, stop application of the measurement voltage between the pair of electrode modules 221 and 231 in response to determination that the environmental conditions around the particulate matter sensor 20 are unstable, i.e., a negative determination in step S41. After stop of application of the measurement voltage between the pair of electrode modules 221 and 231, the heater adjuster 13 is configured to perform the regeneration task again in step S02.

That is, the control apparatus 10 makes it possible to interrupt the malfunction diagnostic routine in response to determination that the environmental conditions around the particulate matter sensor 20 become unstable, and perform the malfunction diagnostic routine again from the regeneration task thereof. This enables sufficiently accurate calculation of the estimates of particulate matter deposited on the sensing member 200.

The heater adjuster 13 is configured to perform a stopping task of stopping the heater 211 from generating heat in step S07 upon determination that the predetermined upper-limit time has elapsed until now since the deposition reduction task was started in step S03, that is, upon an affirmative determination in step S06, independently of whether the environmental conditions around the particulate matter sensor 20 are determined to be stable. Following the operation in step S07, the voltage adjuster 11 is configured to start application of the measurement voltage between the pair of electrode modules 221 and 231 after the stopping task in step S08.

Specifically, the control apparatus 10 is configured to forcibly start application of the measurement voltage between the pair of electrode modules 221 and 231 to thereby start determination of whether there is a malfunction in the particulate filter 110 in response to determination that the environmental conditions around the particulate matter sensor 20 have been unstable for a long time. This configuration ensures sufficient frequency of determining whether there is a malfunction in the particulate filter 110.

The voltage adjuster 11 is configured to stop application of the measurement voltage between the pair of electrode modules 221 and 231 in response to determination that, immediately after application of the measurement voltage between the pair of electrode modules 221 and 231, the deposited-amount current, whose level is higher than the predetermined first threshold level, is flowing through the pair of electrode modules 221 and 231, i.e., in response to a negative determination in step S09. Following the operation in step S09, the heater adjuster 13 is configured to additionally perform the regeneration task again in step S02.

This enables, even if an unburned part of particulate matter is left on the sensing member 200, the additional execution of the regeneration task to reliably eliminate the unburned part of particulate matter from the sensing member 200.

The heater adjuster 13 is configured to perform the regeneration task in step S02 in response to determination that the temperature of the exhaust pipe 130 is higher than or equal to the dry temperature, i.e., in response to an affirmative determination in step S01.

This configuration makes it possible to prevent heating of the sensing member 200 by the heater 211 from being started while moisture is adhered to the sensing member 200, thus preventing damage of the sensing member 200.

The sensing member 200 of the exemplary embodiment is comprised of, as illustrated in FIGS. 3 and 4, the stack of, for example, the substrates 220, which provides alternate arrangement of the electrodes 221 and the electrodes 222 in the stack.

This configuration of the sensing member 200 enables a pitch between each adjacent pair of a corresponding one of the electrodes 221 and a corresponding one of the electrodes 222 to be narrower. Deposition of a merely small quantity of particulate matter on the measurement surface 201 of the sensing member 200 enables the deposited-amount current to flow between the pair of electrode modules 221 and 231. That is, the particulate matter sensor 20 is designed as a high-sensitive sensor. The high-sensitive particulate matter sensor 20 makes shorter the time required to perform the filter malfunction determination subroutine in step S10, i.e., in the sequential operations illustrated in FIG. 8, thus increasing the possibility of completing determination of whether there is a malfunction in the particulate filter 110 while the environmental conditions around the particulate matter sensor 20 are stable.

The exemplary embodiment uses the particulate matter sensor 20 as such a high-sensitive sensor, but can use another type of high-sensitive sensor. For example, the exemplary embodiment can use a particulate matter sensor disclosed in International Patent Application Publication No. 2018/216561, which is comprised of a capacitor connected in series to a pair of electrodes of a sensing member, and configured to measure the amount of particulate matter deposited on the space between the pair of electrodes in accordance with a voltage across the capacitor.

The exemplary embodiment has been described. The present disclosure is not limited to the above exemplary embodiment.

Various modifications, each of which is based on the exemplary embodiment to which a skilled-person's design change has been added, can be included within the scope of the present disclosure as long as each of the various modifications includes the features of the present disclosure. The arrangement, conditions, and shape of each component disclosed in the above exemplary embodiment are not limited to those of the corresponding component according to the present disclosure, and therefore are freely changed. The present disclosure can include various combinations of components described in the exemplary embodiment as long as there is no contradiction in each of the combinations.

The control method and apparatus described in the present disclosure can be implemented by a dedicated computer including a memory and a processor programmed to perform one or more functions embodied by one or more computer programs.

The control method and apparatus described in the present disclosure can also be implemented by a dedicated computer including a processor comprised of one or more dedicated hardware logic circuits.

The control method and apparatus described in the present disclosure can further be implemented by at least one dedicated computer comprised of a memory, a processor programmed to perform one or more functions embodied by one or more computer programs, and one or more hardware logic circuits.

The programs described in the present disclosure can be stored in a computer-readable non-transitory storage medium as instructions executable by a computer and/or a processor.

Each dedicated hardware logic circuit can be implemented by a digital circuit including a plurality of logic gates or an analog circuit including a plurality of logic gates. Each hardware logic circuit can also be implemented by a digital circuit including a plurality of logic gates or an analog circuit including a plurality of logic gates.

What is claimed is:

1. A control apparatus for a particulate matter sensor, the particulate matter sensor comprising a sensing member including a pair of electrodes arranged to face one another; and a heater for heating the sensing member, the particulate matter sensor being configured to cause a current having a level depending on an amount of particulate matter deposited on the sensing member to flow between the pair of electrodes, the control apparatus comprising:
a voltage adjuster configured to apply a voltage between the pair of electrodes, and adjust the voltage applied therebetween;
a heater adjuster configured to cause the heater to generate heat, and adjust an amount of the heat generated by the heater; and
a condition deter miner configured to determine whether an environmental condition around the particulate matter sensor is stable, wherein:
the heater adjuster is configured to:
perform:
a regeneration task of causing the heater to heat the sensing member to burn the particulate matter deposited on the sensing member to thereby remove the particulate matter from the sensing member; and
a deposition reduction task of maintaining, for a predetermined duration, a temperature of the sensing member at a deposition reduction temperature that reduces additional particulate-matter deposition on the sensing member, the predetermined duration being defined from completion of the regeneration task to a time when the environmental condition around the particulate matter sensor is determined to be stable; and
stop the heater from heating the sensing member if the condition determiner determines that the environmental condition around the particulate matter sensor is stable, the voltage adjuster being configured to start application of the voltage between the pair of electrodes.

2. The control apparatus according to claim 1, wherein:
the heater adjuster is configured to determine, as the deposition reduction temperature, a temperature higher than a temperature of an exhaust gas flowing around the particulate matter sensor.

3. The control apparatus according to claim 1, wherein:
the heater adjuster is configured to change the deposition reduction temperature in accordance with the temperature of the exhaust gas flowing around the particulate matter sensor.

4. The control apparatus according to claim 1, wherein:
the condition determiner is configured to:
determine whether an environmental parameter is within a predetermined stable range for a predetermined threshold time, the environmental parameter having an influence on an output of the particulate matter sensor; and
determine that that the environmental condition around the particulate matter sensor is stable in response to determination that the environmental parameter is within the predetermined stable range for the predetermined threshold time.

5. The control apparatus according to claim 4, wherein:
the condition determiner is configured to:
determine whether a fluctuation range of the environmental parameter is smaller than or equal to a predetermined threshold range for the predetermined threshold time; and
determine that that the environmental condition around the particulate matter sensor is stable in response to determination that
the environmental parameter is within the predetermined stable range for the predetermined threshold time; and
the fluctuation range of the environmental parameter is smaller than or equal to the predetermined threshold range for the predetermined threshold time.

6. The control apparatus according to claim 4, wherein:
the condition determiner is configured to:
determine whether one or more absolute differential values of the environmental parameter are smaller than or equal to a predetermined threshold value; and
determine that that the environmental condition around the particulate matter sensor is stable in response to determination that
the environmental parameter is within the predetermined stable range for the predetermined threshold time; and
the one or more absolute differential values of the environmental parameter are smaller than or equal to the predetermined threshold value for the predetermined threshold time.

7. The control apparatus according to claim 4, wherein:
the condition determiner is configured to:
determine whether a length of a locus of a waveform is smaller than or equal to a predetermined threshold length, the waveform representing temporarily fluctuating values of the environmental parameter; and
determine that that the environmental condition around the particulate matter sensor is stable in response to determination that the environmental parameter is within the predetermined stable range for the predetermined threshold time; and the length of the locus of the graphic waveform is smaller than or equal to the predetermined threshold length.

8. The control apparatus according to claim 1, wherein:

the voltage adjuster is configured to, after start of application of the voltage between the pair of electrodes, stop application of the voltage between the pair of electrodes in response to determination that the environmental condition around the particulate matter sensor is unstable; and the heater adjuster being configured to perform the regeneration task again after the stop of application of the voltage.

9. The control apparatus according to claim 1, wherein:

the heater adjuster is configured to perform a stopping task of stopping the heater from heating the sensing member in response to determination that a predetermined upper-limit time has elapsed since the deposition reduction task was started independently of whether the environmental condition around the particulate matter sensor is determined to be stable; and the voltage adjuster is configured to start application of the voltage between the pair of electrodes after the stopping task.

10. The control apparatus according to claim 1, wherein:

the voltage adjuster is configured to stop application of the voltage between the pair of electrodes in response to determination that, immediately after application of the voltage between the pair of electrodes, the level of the current flowing through the pair of electrodes is higher than a predetermined threshold level; and the heater adjuster is configured to perform the regeneration task again after the stop of application of the voltage.

11. The control apparatus according to claim 1, wherein:

the particulate matter sensor is disposed in an exhaust pipe for discharging the exhaust gas from an internal combustion engine; and the heater adjuster is configured to perform the regeneration task in response to determination that a temperature of the exhaust pipe is higher than or equal to a predetermined dry temperature after start-up of the internal combustion engine.

* * * * *